(12) United States Patent
Yamamoto et al.

(10) Patent No.: US 10,839,532 B2
(45) Date of Patent: Nov. 17, 2020

(54) IMAGE PROCESSING METHOD AND INFORMATION PROCESSING APPARATUS

(71) Applicant: FUJITSU LIMITED, Kawasaki (JP)

(72) Inventors: Takaya Yamamoto, Yokohama (JP); Daisuke Abe, Fukuoka (JP); Kazuo Sasaki, Kobe (JP); Mari Iwasaki, Fukuoka (JP); Kenji Orita, Kasuya (JP); Naoshi Kayashima, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 16/166,298

(22) Filed: Oct. 22, 2018

(65) Prior Publication Data

US 2019/0147604 A1   May 16, 2019

(30) Foreign Application Priority Data

Nov. 13, 2017   (JP) .................................. 2017-218636

(51) Int. Cl.
*G06T 7/254* (2017.01)
*G06T 7/292* (2017.01)
*G06T 7/246* (2017.01)

(52) U.S. Cl.
CPC .............. *G06T 7/254* (2017.01); *G06T 7/248* (2017.01); *G06T 7/292* (2017.01); *G06T 2207/30196* (2013.01); *G06T 2207/30224* (2013.01); *G06T 2207/30241* (2013.01)

(58) Field of Classification Search
CPC ......... G06T 7/254; G06T 7/248; G06T 7/292; G06T 2207/30241; G06T 2207/30224

USPC ......................................................... 382/107
See application file for complete search history.

(56) References Cited

U.S. PATENT DOCUMENTS

| 2005/0254686 A1 | 11/2005 | Koizumi |
| 2017/0124388 A1 * | 5/2017 | Ueda ................... G06K 9/00758 |
| 2017/0132784 A1 * | 5/2017 | Yamada ..................... G06T 7/74 |

FOREIGN PATENT DOCUMENTS

| JP | 2001-273500 | 10/2001 |
| JP | 2004-046647 | 2/2004 |
| JP | 2004-096402 | 3/2004 |
| JP | 2009-143722 | 7/2009 |
| JP | 2016-099941 | 5/2016 |

* cited by examiner

*Primary Examiner* — Ayodeji O Ayotunde
(74) *Attorney, Agent, or Firm* — Fujitsu Patent Center

(57) ABSTRACT

An information processing apparatus includes a processor that detects positions of ball candidates from a plurality of time-series image frames. The processor adds a position of a second ball candidate to a second image frame subsequent to a first image frame based on a position of a first ball candidate and movement definition information. The first ball candidate is detected from the first image frame. The movement definition information defines a characteristic of a movement of a ball. The processor generates a plurality of trajectory candidates by combining a plurality of ball candidates detected from image frames of different times. The processor evaluates the plurality of trajectory candidates to determine a ball trajectory. The processor interpolates, when the ball trajectory is interrupted, between a starting point and an ending point of the interruption with a trajectory of a first person who moves from the starting point to the ending point.

20 Claims, 26 Drawing Sheets

FIG. 4

BUFFER (140a)

141a

| CAMERA IDENTIFICATION INFORMATION | FRAME NO. | TIME | IMAGE FRAME |
|---|---|---|---|
| CAMERA 10a | F101 | T1 | IMAGE FRAME OF FRAME NO. F101 |
|  | F102 | T2 | IMAGE FRAME OF FRAME NO. F102 |
|  | F103 | T3 | IMAGE FRAME OF FRAME NO. F103 |
|  | ... | ... | ... |

141b

| CAMERA IDENTIFICATION INFORMATION | FRAME NO. | TIME | IMAGE FRAME |
|---|---|---|---|
| CAMERA 10b | F101 | T1 | IMAGE FRAME OF FRAME NO. F101 |
|  | F102 | T2 | IMAGE FRAME OF FRAME NO. F102 |
|  | F103 | T3 | IMAGE FRAME OF FRAME NO. F103 |
|  | ... | ... | ... |

141c

| CAMERA IDENTIFICATION INFORMATION | FRAME NO. | TIME | IMAGE FRAME |
|---|---|---|---|
| CAMERA 10c | F101 | T1 | IMAGE FRAME OF FRAME NO. F101 |
|  | F102 | T2 | IMAGE FRAME OF FRAME NO. F102 |
|  | F103 | T3 | IMAGE FRAME OF FRAME NO. F103 |
|  | ... | ... | ... |

141d

| CAMERA IDENTIFICATION INFORMATION | FRAME NO. | TIME | IMAGE FRAME |
|---|---|---|---|
| CAMERA 10d | F101 | T1 | IMAGE FRAME OF FRAME NO. F101 |
|  | F102 | T2 | IMAGE FRAME OF FRAME NO. F102 |
|  | F103 | T3 | IMAGE FRAME OF FRAME NO. F103 |
|  | ... | ... | ... |

| IMAGE FRAME COORDINATES (pix) | GLOBAL COORDINATES (m) |
|---|---|
| 0, 0 | 25.2, 13.4 |
| 0, 1 | 25.2, 13.6 |
| ... | ... |
| w, h | W, H |

FIG. 8

BALL MANAGEMENT TABLE (140c, 143a)

| TIME | NUMBER OF CANDIDATES | CANDIDATE IDENTIFICATION INFORMATION | COORDINATES | CANDIDATE IDENTIFICATION INFORMATION | COORDINATES | ... |
|---|---|---|---|---|---|---|
| T1 | N1 | B1001 | x11, y11 | B2001 | x21, y21 | ... |
| T2 | N2 | B1002 | x12, y12 | B2002 | x22, y22 | ... |
| T3 | N3 | B1003 | x13, y13 | B2003 | x23, y23 | ... |
| ... | ... | ... | ... | ... | ... | ... |

143b

| CANDIDATE IDENTIFICATION INFORMATION | LOST FLAG |
|---|---|
| B1001 | 0 |
| B1002 | 1 |
| B1003 | 0 |
| ... | ... |

FIG. 9

| TIME | PLAYER IDENTIFICATION INFORMATION COORDINATES OF PLAYER HAVING "H101" | PLAYER IDENTIFICATION INFORMATION COORDINATES OF PLAYER HAVING "H102" | ... |
|---|---|---|---|
| T1 | xa11, ya11 | xa21, ya21 | ... |
| T2 | xa12, ya12 | xa22, ya22 | ... |
| T3 | xa13, ya13 | xa23, ya23 | ... |
| ... | ... | ... | ... |

| EVENT IDENTIFICATION INFORMATION | SHAPE | SPEED | ... |
|---|---|---|---|
| E101 | STRAIGHT LINE | ○m/s | ... |
| E102 | CURVE (CURVATURE○○) | ○m/s | ... |
| E103 | CURVE (CURVATURE○○) | ○m/s | ... |

| TRAJECTORY CANDIDATE IDENTIFICATION INFORMATION | TOTAL NUMBER OF TIMES OF LOST | CANDIDATE IDENTIFICATION INFORMATION | COORDINATES |
|---|---|---|---|
| k101 | 3 | B1001, B1002, B1003, ... | (x11, y11), (x12, y12), (x13, y13), ... |
| k102 | 4 | B2001, B2002, B2003, ... | (x21, y21), (x22, y22), (x23, y23), ... |
| ... | | ... | ... |

| TRAJECTORY IDENTIFICATION INFORMATION | CANDIDATE IDENTIFICATION INFORMATION | COORDINATES | CORRESPONDING INFORMATION |
|---|---|---|---|
| K101 | B1001, B1002, ... | (x11, y11), (x12, y12), ... | PLAYER IDENTIFICATION INFORMATION 「H101」; TIME PERIOD Ta1 ~ Ta10, PLAYER IDENTIFICATION INFORMATION 「H102」; TIME PERIOD Tb15 ~ Ta20, ... |
| K102 | B5001, B5002, ... | (x51, y51), (x52, y52), ... | PLAYER IDENTIFICATION INFORMATION 「H105」; TIME PERIOD Te1 ~ Te10, ... |
| ... | ... | ... | ... |

| PLAYER IDENTIFICATION INFORMATION | MOMENTUM (km) | DRIBBLING DISTANCE(km) | NUMBER OF TIMES PASSING | ... |
|---|---|---|---|---|
| H101 | 3.4 | 1.2 | 40 | ... |
| H102 | 5.8 | 2.3 | 25 | ... |
| H103 | 3.3 | 1.2 | 30 | ... |
| ... | ... | ... | ... | ... |

FIG. 15
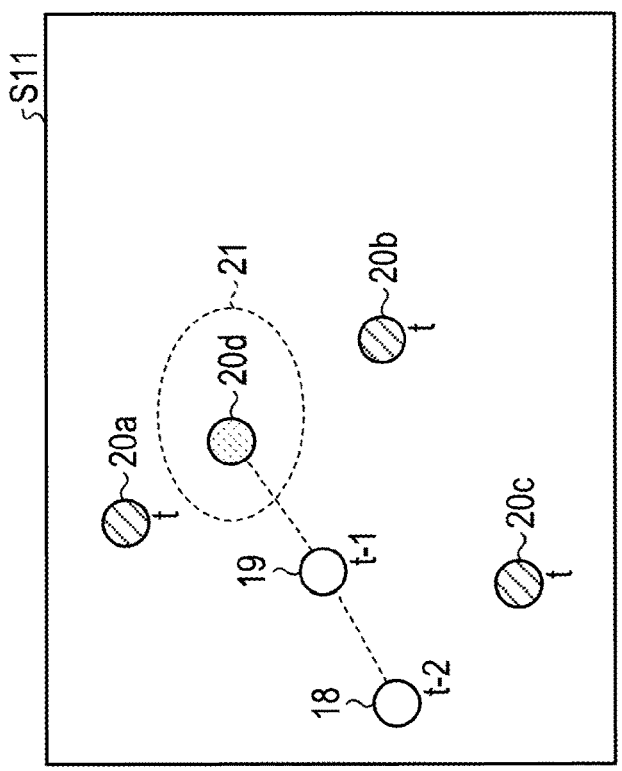
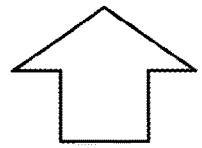
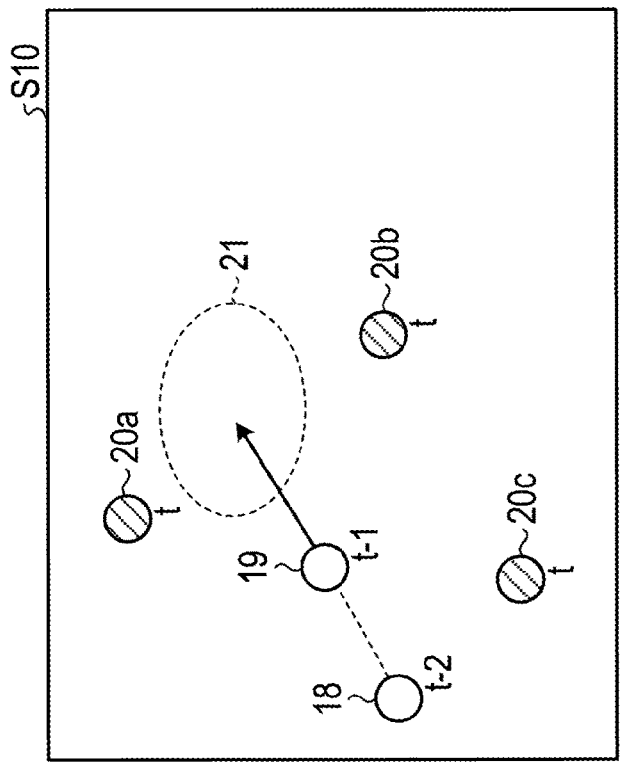

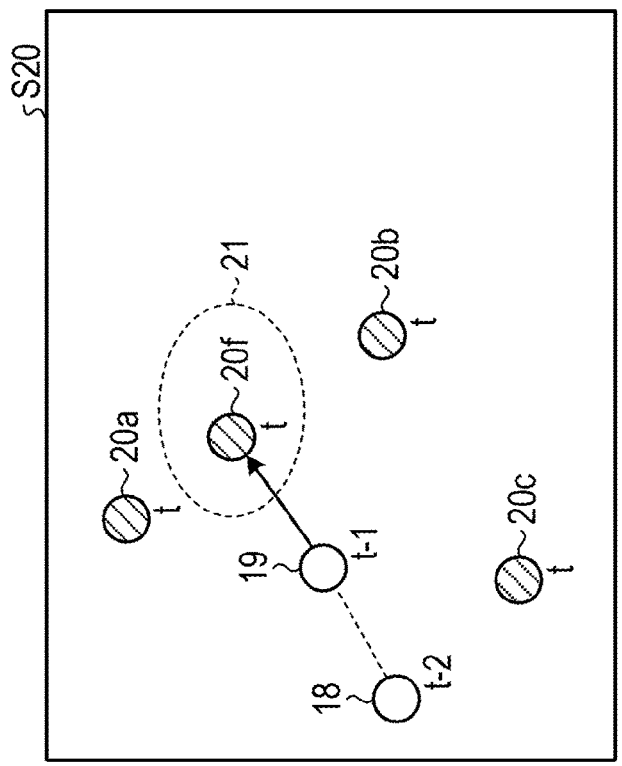
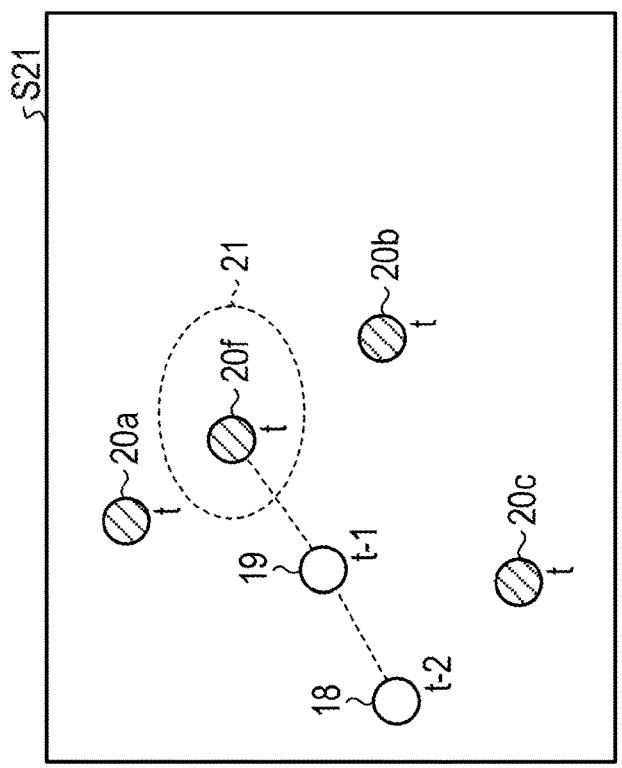
FIG. 16

FIG. 18
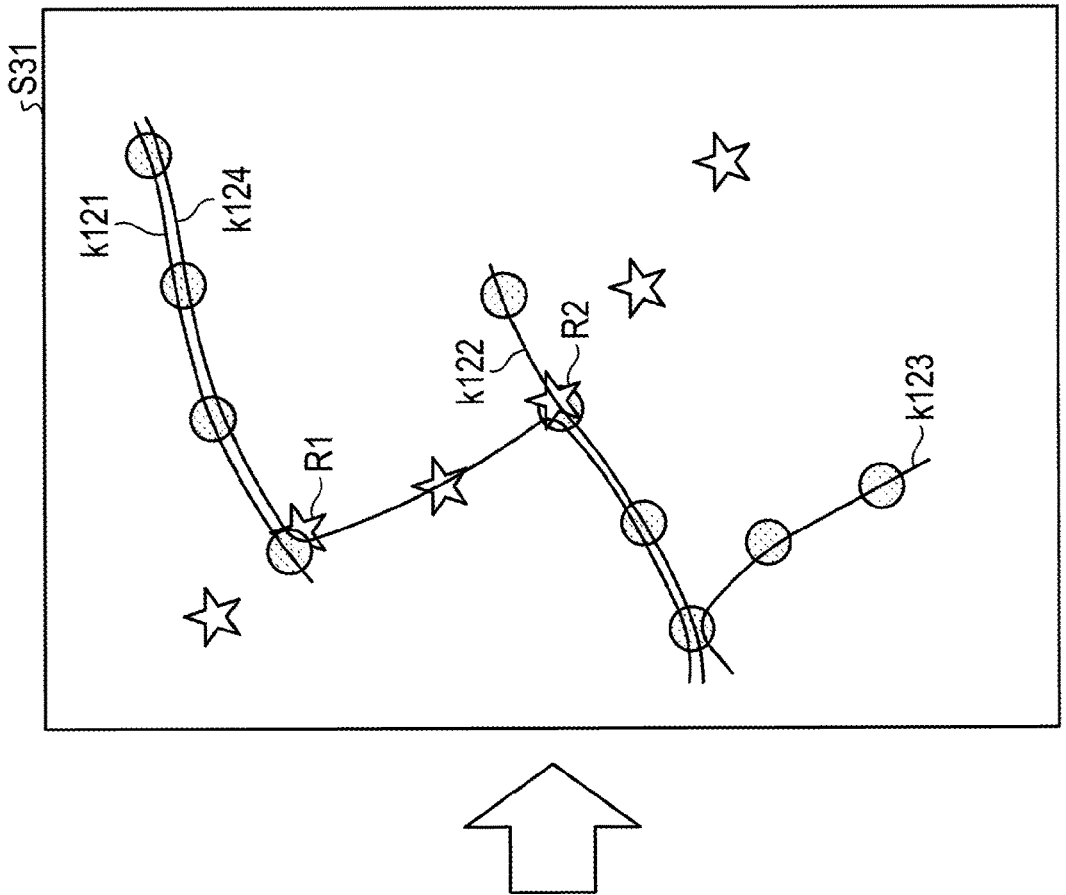
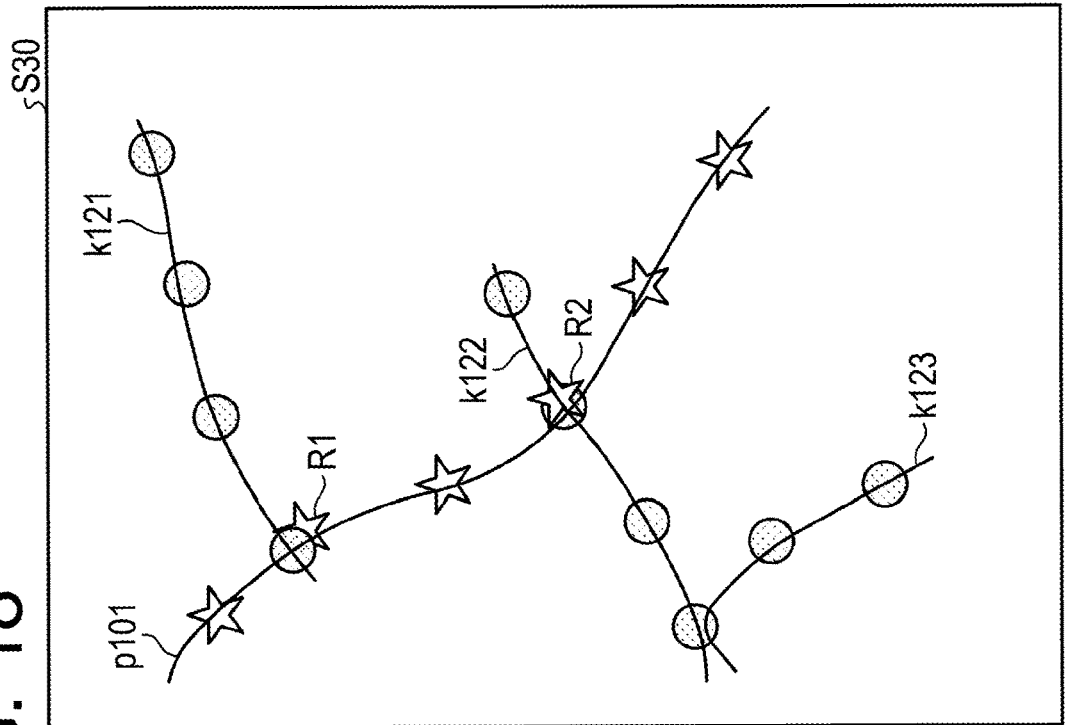

| LANDMARK IDENTIFICATION INFORMATION | STARTING POINT COORDINATES | ENDING POINT COORDINATES |
|---|---|---|
| L101 | xl11, yl11 | xl11, yl11 |
| L102 | xl21, yl21 | xl22, yl22 |
| L103 | xl31, yl31 | xl32, yl32 |
| ... | ... | ... |

IMAGE PROCESSING METHOD AND INFORMATION PROCESSING APPARATUS

CROSS-REFERENCE TO RELATED APPLICATION

This application is based upon and claims the benefit of priority of the prior Japanese Patent Application No. 2017-218636, filed on Nov. 13, 2017, the entire contents of which are incorporated herein by reference.

FIELD

The embodiments discussed herein are related to an image processing method and an information processing apparatus.

BACKGROUND

The information and communication technology (ICT) has recently been introduced in the field of sports. For example, there is a technique which captures images of a game and generates statistical information based on the captured images. The statistical information refers to information that combines game performances of a team or an individual player.

Here, in order to generate the statistical information, the movements of a player and a ball are both used as input information. As for a technique of tracking the movement of a person, there is, for example, a technique which connects images of a person appearing on multiple cameras in sequence to generate tracking information, based on statistical information premising that the movement speed or direction of a person is somewhat constant. Further, there is a technique which tracks a person by using a template.

In addition, as for a technique of tracking the movement of a ball, there is, for example, a technique which detects a ball by a difference image between a background image and an image including a ball and tracks the ball by using a vector related to the ball among images. Further, there is a technique which tracks a ball by detecting the ball from a camera image through an image processing on the premise that, for example, a reflecting material is used for the ball.

Related technologies are disclosed in, for example, Japanese Laid-open Patent Publication No. 2016-099941, Japanese Laid-open Patent Publication No. 2004-046647, Japanese Laid-open Patent Publication No. 2009-143722, Japanese Laid-open Patent Publication No. 2004-096402, U. S. Patent Publication No. 2005/0254686, and Japanese Laid-open Patent Publication No. 2001-273500.

SUMMARY

According to an aspect of the present invention, provided is an information processing apparatus including a memory and a processor coupled to the memory. The processor is configured to detect positions of ball candidates from a plurality of time-series image frames. The processor is configured to add a position of a second ball candidate to a second image frame subsequent to a first image frame based on a position of a first ball candidate and movement definition information. The first and second image frames are included in the plurality of image frames. The first ball candidate is detected from the first image frame. The movement definition information defines a characteristic of a movement of a ball. The processor is configured to generate a plurality of trajectory candidates by combining a plurality of ball candidates detected from image frames of different times with each other. The processor is configured to evaluate the plurality of trajectory candidates to determine a ball trajectory. The processor is configured to interpolate, when the ball trajectory is interrupted, between a starting point and an ending point of the interruption with a trajectory of a first person who moves from the starting point to the ending point.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a view illustrating an example of a data structure of a buffer according to Embodiment 1;

FIG. 8 is a view illustrating an example of a data structure of a ball management table according to Embodiment 1;

FIG. 9 is a view illustrating an example of a data structure of a player management table according to Embodiment 1;

FIG. 10 is a view illustrating an example of a data structure of movement definition information according to Embodiment 1;

FIG. 11 is a view illustrating an example of a data structure of a trajectory candidate management table according to Embodiment 1;

FIG. 12 is a view illustrating an example of a data structure of a trajectory management table according to Embodiment 1;

FIG. 13 is a view illustrating an example of a data structure of statistical information according to Embodiment 1;

FIG. 15 is a view (part 2) for describing the process performed by the ball detection unit according to Embodiment 1;

FIG. 16 is a view (part 3) for describing the process performed by the ball detection unit according to Embodiment 1;

FIG. 18 is a view (part 1) for describing a process performed by a trajectory determination unit according to Embodiment 1;

DESCRIPTION OF EMBODIMENTS

In the related art described above, for example, the ball may not be necessarily tracked, which is problematic.

For example, when the movement of a ball is tracked, the movement of the ball is required to be continuously tracked even in a case where the ball is hidden behind a person when seen from a camera. Even in the case where the ball is hidden by a person, the movement of the ball may be predicted for a short time period by using a vector related to the ball among images as described above. However, in the techniques described above, when the ball is hidden by the person for a specific time period or longer, tracking the ball is discontinued. That is, the ball may not be tracked.

Hereinafter, embodiments will be described in detail based on the accompanying drawings. The present disclosure is not limited by the embodiments.

Embodiment 1

Figure 1:
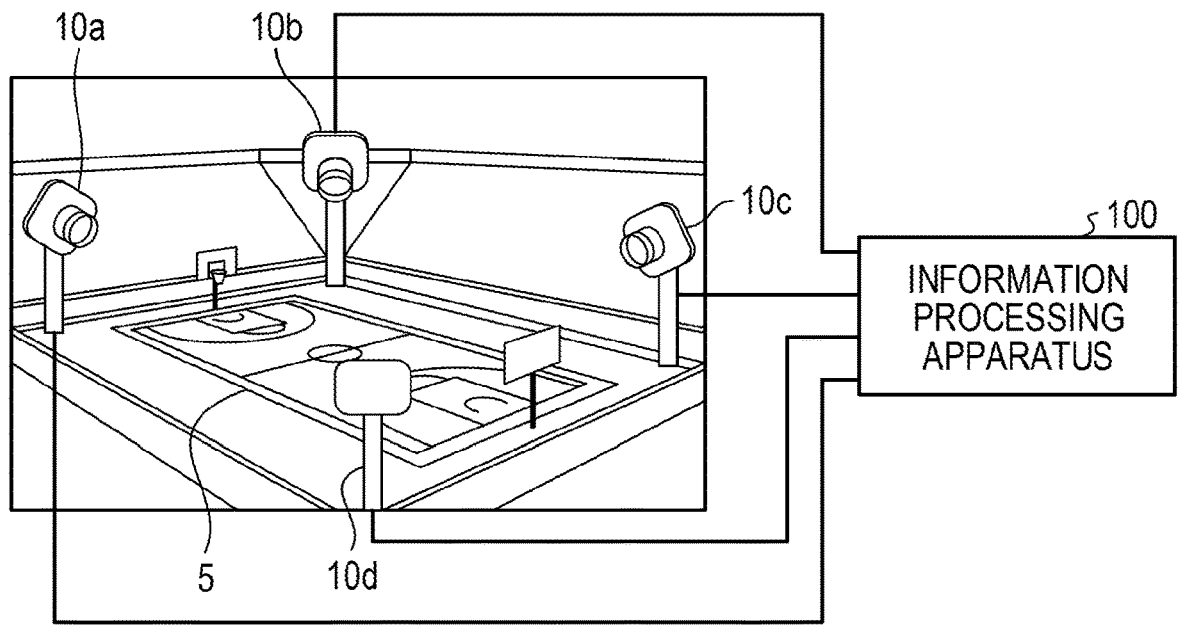
FIG. 1 is a view illustrating an example of a system according to Embodiment 1 of the present disclosure.

FIG. 1 is a view illustrating an example of a system according to Embodiment 1. As illustrated in FIG. 1, the system includes cameras 10a, 10b, 10c, and 10d and an information processing apparatus 100. Although not illustrated, it is assumed that multiple players are playing a game using a ball in a game area 5. For example, the game that the players are playing includes, for example, a soccer, basketball, handball, hockey, rugby, and lacrosse. The cameras 10a, 10b, 10c, and 10d and the information processing apparatus 100 are connected to each other.

Figure 2:
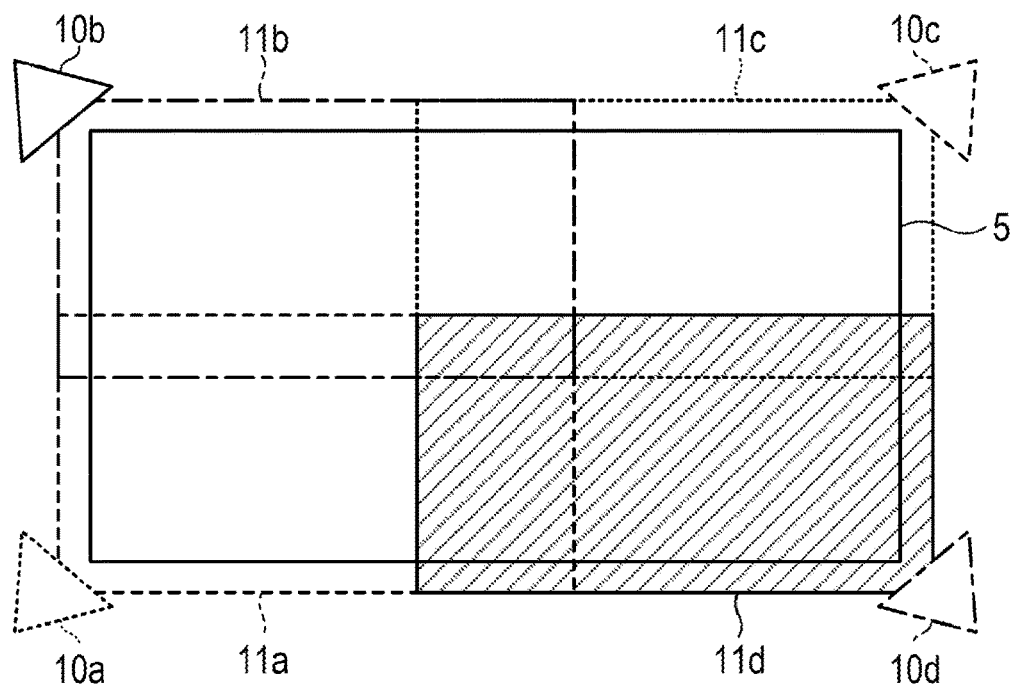
FIG. 2 is a view illustrating an example of image capturing ranges of cameras.

The cameras 10a to 10d capture the images of the game area 5. In Embodiment 1, as an example, the game area 5 is divided and images of the divided areas are captured using the cameras 10a to 10d. FIG. 2 is a view illustrating an example of image capturing ranges of the cameras. As illustrated in FIG. 2, the image capturing range of the camera 10a is an image capturing range 11a. The image capturing range of the camera 10b is an image capturing range 11b. The image capturing range of the camera 10c is an image capturing range 11c. The image capturing range of the camera 10d is an image capturing range 11d. Images of the entire game area 5 may be captured with the image capturing ranges 11a to 11d.

The cameras 10a to 10d transmit the image data of the image capturing ranges to the information processing apparatus 100. The image data includes multiple image frames which are arranged in sequence. Each image frame is data of a still image of a single frame. In the following descriptions, the cameras 10a to 10d may be collectively referred to as the camera 10. In addition, the image data is assigned with information for identifying the camera 10 capturing the image data.

The information processing apparatus 100 analyzes each image frame included in the image data transmitted from the camera 10 to track the position of the ball on the game area 5. For example, the information processing apparatus 100 tracks a position of a ball candidate detected from each image frame based on a prediction of the movement of the ball. Further, the information processing apparatus 100 generates a ball trajectory for a time period when no ball candidate is detected from an image frame, based on a movement trajectory of a player.

Figure 3:
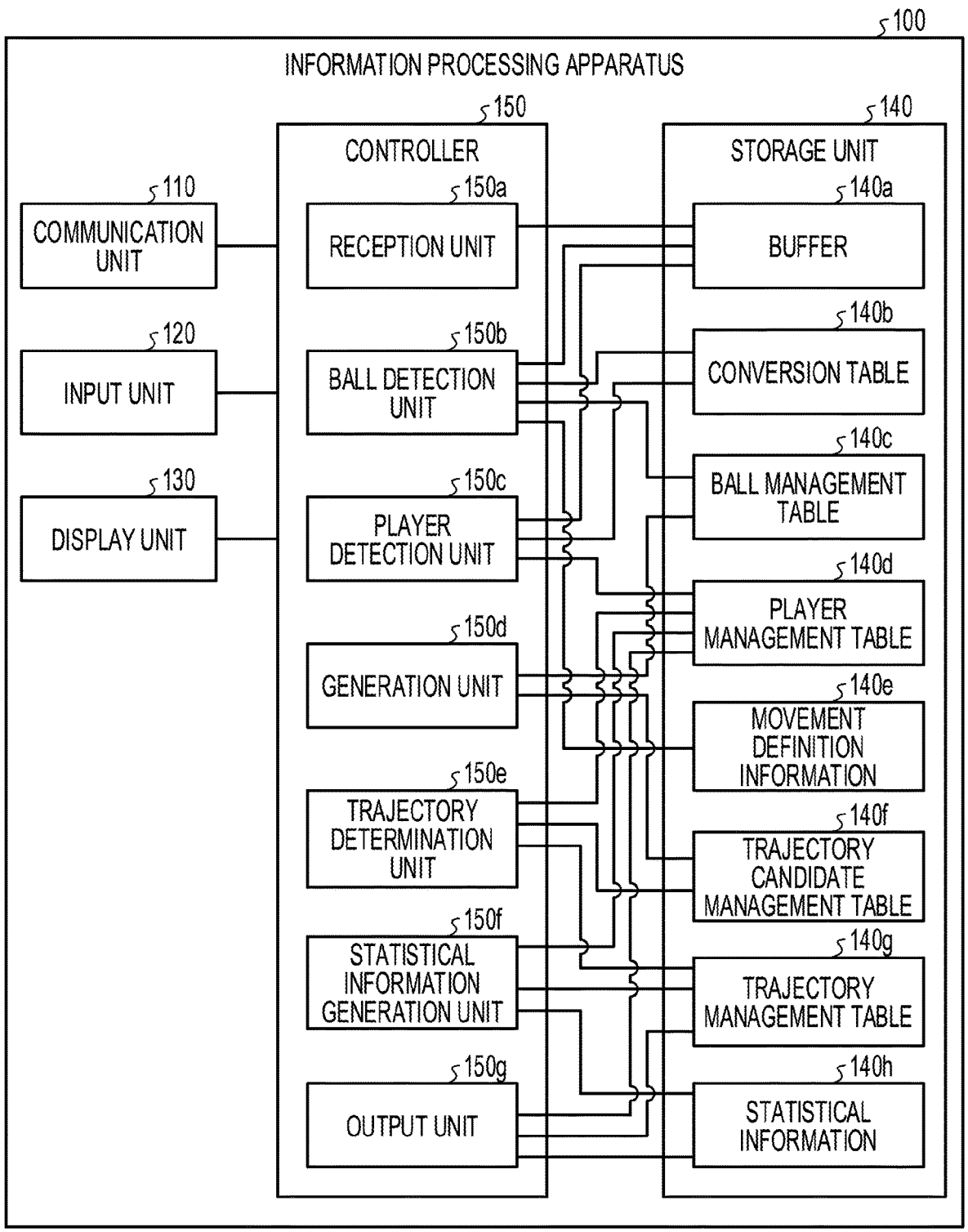
FIG. 3 is a view illustrating a configuration of an information processing apparatus according to Embodiment 1.

FIG. 3 is a view illustrating a configuration of the information processing apparatus according to Embodiment 1. As illustrated in FIG. 3, the information processing apparatus 100 includes a communication unit 110, an input unit 120, a display unit 130, a storage unit 140, and a controller 150.

The communication unit 110 is a processing unit that executes a data communication with the camera 10 via, for example, a network. For example, the communication unit 110 receives the image data from the camera 10. The communication unit 110 outputs the received image data to the controller 150. The communication unit 110 is an example of a communication device.

The input unit 120 is an input device for inputting various types of information to the information processing apparatus 100. The input unit 120 corresponds to, for example, a keyboard, a mouse, or a touch panel.

The display unit 130 is a display device that displays various types of information output from the controller 150. The display unit 130 corresponds to, for example, a liquid crystal display or a touch panel.

The storage unit 140 includes a buffer 140a, a conversion table 140b, a ball management table 140c, a player management table 140d, movement definition information 140e, a trajectory candidate management table 140f, a trajectory management table 140g, and statistical information 140h. The storage unit 140 corresponds to a semiconductor memory device such as a random access memory (RAM), a read only memory (ROM) or a flash memory, or a storage device such as a hard disk drive (HDD).

The buffer 140a holds the image data transmitted from the camera 10. FIG. 4 is a view illustrating an example of a data structure of the buffer according to Embodiment 1. As illustrated in FIG. 4, the buffer 140a has multiple tables 141a, 141b, 141c, and 141d.

The table 141a stores the image data captured by the camera 10a. The table 141b stores the image data captured by the camera 10b. The table 141c stores the image data captured by the camera 10c. The table 141d stores the image data captured by the camera 10d.

In each of the tables 141a to 141d, camera identification information, a frame number, time, and an image frame are associated with each other. The camera identification information is information for uniquely identifying the camera 10. The frame number is information for uniquely identifying an image frame. The time indicates the time when an image frame is captured. The image frame corresponds to the frame number.

Figures 5, 6:
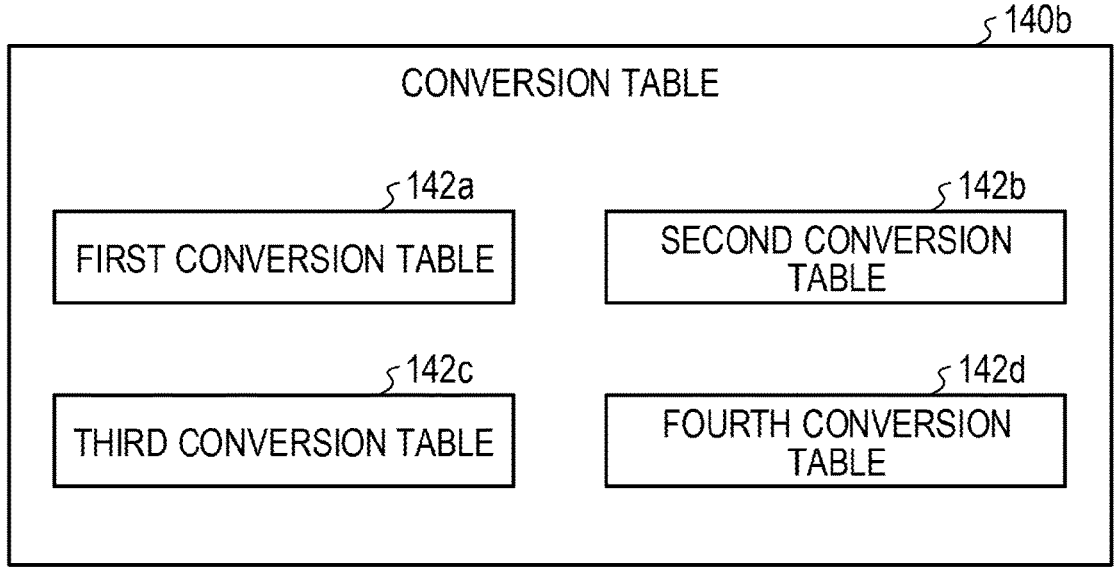
FIG. 5 is a view illustrating an example of a data structure of a conversion table according to Embodiment 1.
FIG. 6 is a view illustrating an example of a data structure of a second conversion table.

The conversion table 140b is a table in which coordinates on an image frame captured by the camera 10 and coordinates on the game area 5 are associated with each other. FIG. 5 is a view illustrating an example of a data structure of the conversion table according to Embodiment 1. As illustrated in FIG. 5, the conversion table 140b includes a first conversion table 142a, a second conversion table 142b, a third conversion table 142c, and a fourth conversion table 142d.

The first conversion table 142a is a table in which coordinates on an image frame captured by the camera 10a and coordinates on the game area 5 are associated with each other. The second conversion table 142b is a table in which coordinates on an image frame captured by the camera 10b and coordinates on the game area 5 are associated with each other. The third conversion table 142c is a table in which coordinates on an image frame captured by the camera 10c and coordinates on the game area 5 are associated with each other. The fourth conversion table 142d is a table in which coordinates on an image frame captured by the camera 10d and coordinates on the game area 5 are associated with each other.

Here, as an example, the data structure of the second conversion table 142b will be described. FIG. 6 is a view illustrating an example of the data structure of the second conversion table. As illustrated in FIG. 6, in the second conversion table 142b, image frame coordinates and global coordinates are associated with each other. The image frame coordinates indicate coordinates on an image frame captured by the camera 10b. The image frame coordinates are represented by pixels. The global coordinates indicate coordinates of the game area 5. The global coordinates are represented by "m." For example, the image frame coordinates "0, 1" correspond to the global coordinates "25.2, 13, 6."

Figure 7:
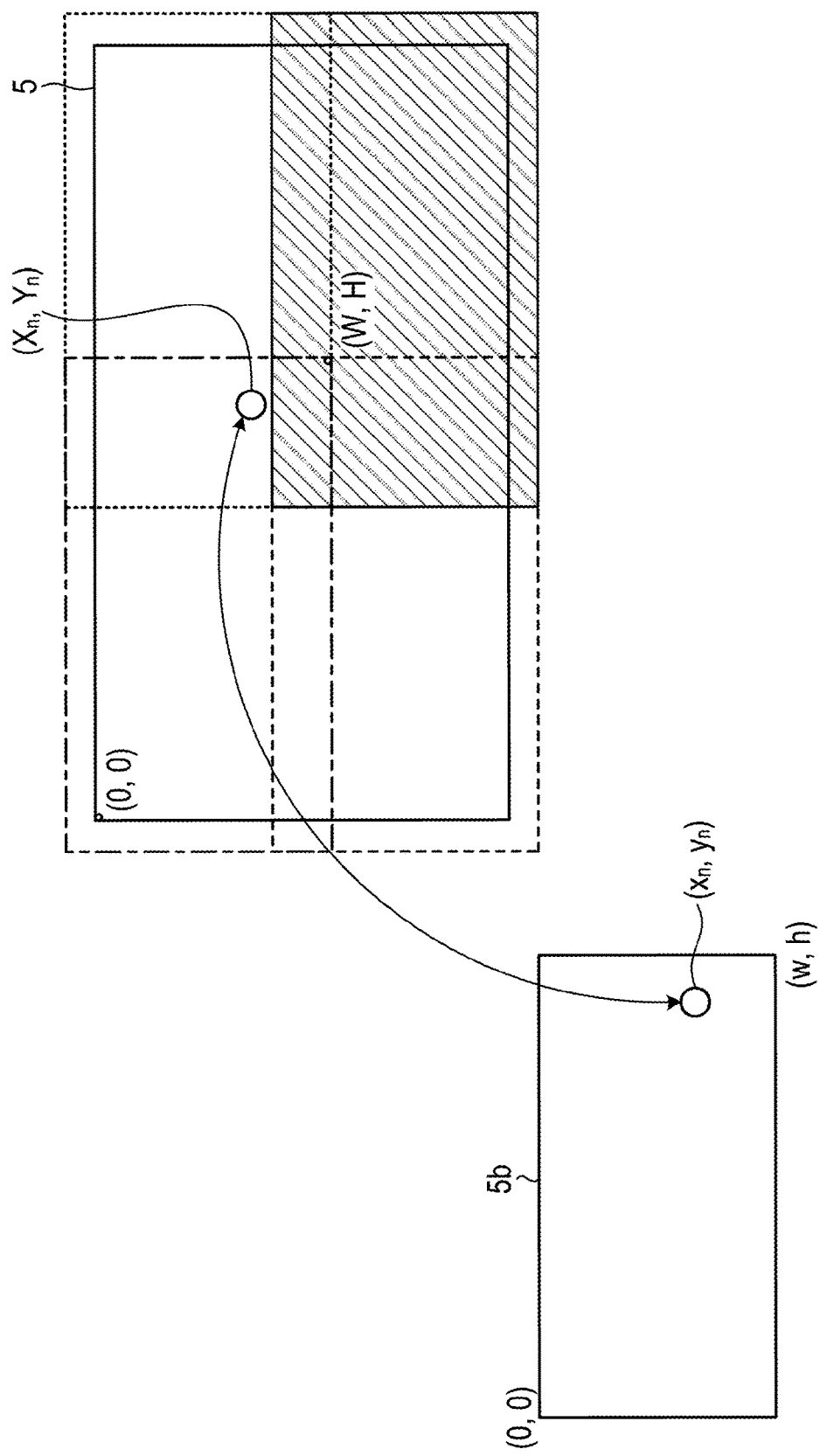
FIG. 7 is a view for describing a relationship between an image frame coordinate system and a global coordinate system.

FIG. 7 is a view for describing the relationship between the image frame coordinate system and the global coordinate system. In FIG. 7, an image frame 5b corresponds to an image frame captured by the camera 10b at a specific time. For example, the image frame coordinates $(X_n, Y_n)$ on the image frame 5b correspond to the global coordinates $(X_n, Y_n)$ on the game area 5.

Although not described here, the relationship between the image frame coordinates and the global coordinates is also similarly defined in the first conversion table 142a, the third conversion table 142c, and the fourth conversion table 142d.

Referring back to FIG. 3, the ball management table 140c holds information on a ball candidate detected from each image frame. FIG. 8 is a view illustrating an example of a data structure of the ball management table according to Embodiment 1. As illustrated in FIG. 8, the ball management table 140c includes tables 143a and 143b.

In FIG. 8, the table 143a of the ball management table 140c holds information on coordinates of a ball candidate detected at each time. In the table 143a, time, the number of candidates, candidate identification information, and coordinates are associated with each other. The time indicates a time when a ball candidate is detected. The number of candidates indicates the number of ball candidates included in each of image frames captured by the cameras 10a to 10d at the same time. The candidate identification information is information for uniquely identifying a ball candidate on an image frame. The coordinates are information indicating coordinates (global coordinates) of a ball. When multiple ball candidates are detected at the same time, multiple sets each including the candidate identification information and the coordinates are registered in the same record.

In FIG. 8, the table 143b of the ball management table 140c holds information for distinguishing whether a lost flag is assigned to a ball candidate detected in each image frame. As illustrated in FIG. 8, in the table 143b, the candidate identification information and the lost flag are associated with each other. The lost flag "0" indicates that no lost flag has been assigned. The lost flag "1" indicates that a lost flag has been assigned. It is assumed that the initial value of the lost flag is "0." The assignment of the lost flag will be specifically described later. Here, for example, the lost flag is assigned when a ball candidate is unlikely to be a ball. In addition, as for a ball trajectory candidate, a trajectory where the total number of ball candidates each set with the lost flag "1" is equal to or more than a threshold value is excluded from the ball trajectory candidate.

The player management table 140d holds positional information of each player detected from each image frame. FIG. 9 is a view illustrating an example of a data structure of the player management table according to Embodiment 1. As illustrated in FIG. 9, in the player management table 140d, time and coordinates of each player having player identification information are associated with each other. The player identification information is information for uniquely identifying a player. The coordinates of each player having the player identification information are coordinates of the global coordinate system. For example, it is indicated that at a time "T1," a player having player identification information "H101" is positioned at coordinates (xa11, ya11), and a player having player identification information "H102" is positioned at coordinates (xa21, ya21).

The movement definition information 140e holds information on a movement of a ball. As described later, the information processing apparatus 100 predicts a ball trajectory by using the movement definition information 140e. FIG. 10 is a view illustrating an example of a data structure of the movement definition information according to Embodiment 1. As illustrated in FIG. 10, in the movement definition information, event identification information, shape, and speed are associated with each other. The event identification information is information for identifying an event such as passing, shooting, or centering which is performed by a player. The shape indicates a trajectory of a movement of the ball corresponding to the event. The speed indicates the speed of the ball corresponding to the event.

The trajectory candidate management table 140f holds information on a ball trajectory candidate. FIG. 11 is a view illustrating an example of a data structure of the trajectory candidate management table according to Embodiment 1. As illustrated in FIG. 11, in the trajectory candidate management table 140f, trajectory candidate identification information, the total number of times of lost, candidate identification information, and coordinates are associated with each other. The trajectory candidate identification information is information for uniquely identifying a ball trajectory candidate. The total number of times of lost indicates the total number of ball candidates assigned with the lost flag, among ball candidates included in the ball trajectory candidate. The candidate identification information is information for uniquely identifying a ball candidate included in the ball trajectory candidate. The coordinates indicate coordinates of each ball candidate included in the ball trajectory candidate. A trajectory tracing the respective coordinates of the same record becomes a ball trajectory candidate.

The trajectory management table 140g holds information on a determined ball trajectory. In Embodiment 1, the determined ball trajectory will be simply referred to as a ball trajectory. FIG. 12 is a view illustrating an example of a data structure of the trajectory management table according to Embodiment 1. As illustrated in FIG. 12, in the trajectory management table 140g, trajectory identification information, candidate identification information, coordinates, and corresponding information are associated with each other. The trajectory identification information is information for uniquely identifying a ball trajectory. The candidate identification information is information for uniquely identifying each ball candidate constituting the ball trajectory. The coordinates indicate the coordinates of each ball candidate included in the ball trajectory.

The corresponding information indicates information on a movement trajectory of a player in a ball trajectory. For example, it is indicated that the ball trajectory of trajectory identification information "K101" includes a movement trajectory of a player having player identification information "H101" for a time period Ta1 to Ta10 and a movement trajectory of a player having player identification information "H102" for a time period Tb15 to Tb20.

The statistical information 140h holds statistical information on a player. FIG. 13 is a view illustrating an example of a data structure of the statistical information according to Embodiment 1. As illustrated in FIG. 13, in the statistical information 140h, player identification information, a momentum, a dribbling distance, and the number of times of passing are associated with each other. The player identification information is information for uniquely identifying a player. The momentum indicates the moving distance of a player during the game. The dribbling distance indicates the moving distance of a player dribbling the ball during the game. The number of times of passing indicates the number of times that a player passes the ball during the game.

Referring back to FIG. 3, the controller 150 includes a reception unit 150a, a ball detection unit 150b, a player detection unit 150c, a generation unit 150d, a trajectory determination unit 150e, and a statistical information generation unit 150f. Further, the controller 150 includes an output unit 150g. The controller 150 is implemented by, for example, a central processing unit (CPU) or a micro processing unit (MPU). In addition, the controller 150 may also be implemented by a hard wired logic such as an application specific integrated circuit (ASIC) or a field programmable gate array (FPGA).

The reception unit 150a is a processing unit that receives the image data from the camera 10. The reception unit 150a stores the received image data in the buffer 140a. The reception unit 150a stores the image data received from the camera 10a in the table 141a of the buffer 140a. The reception unit 150a stores the image data received from the camera 10b in the table 141b of the buffer 140a. The reception unit 150a stores the image data received from the camera 10c in the table 141c of the buffer 140a. The reception unit 150a stores the image data received from the camera 10d in the table 141d of the buffer 140a.

The ball detection unit 150b is a processing unit that detects a position of a ball candidate from each image frame stored in the buffer 140a. The ball detection unit 150b is an example of a detection unit. For example, the ball detection unit 150b executes a process of detecting a position of a ball candidate and a process of adding a position of a ball candidate.

The process in which the ball detection unit 150b detects a position of a ball candidate will be described. Here, as an example, descriptions will be made on the process of detecting a ball candidate from the image data (image frame) captured by the camera 10a and stored in the table 141a of the buffer 140a. The ball detection unit 150b generates a difference image between the image frame of the time T1 and the image frame of the time T2 in the table 141a. The ball detection unit 150b compares the area of the region remaining on the difference image with a template defining the area of the ball, and detects the region on the difference image where the difference from the area of the template is less than a threshold value, as a ball candidate.

Figure 14:
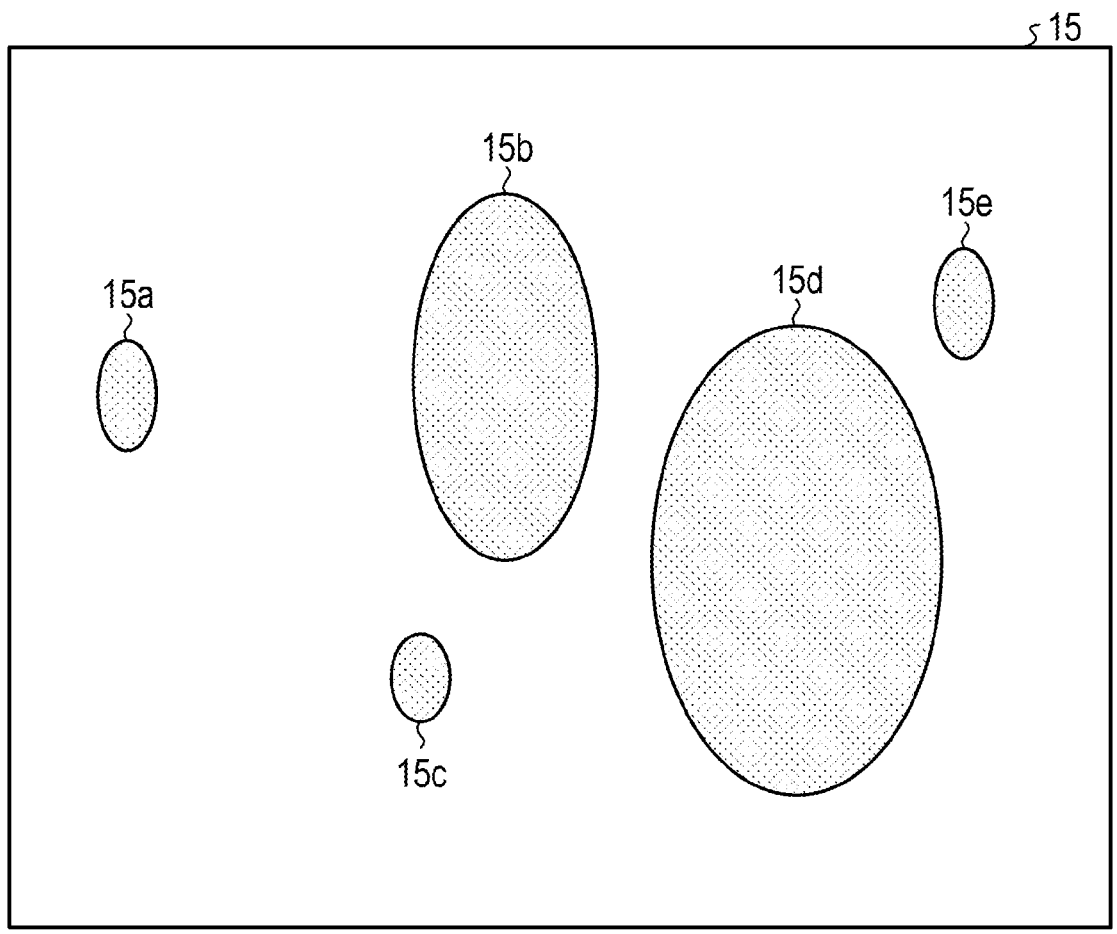
FIG. 14 is a view (part 1) for describing a process performed by a ball detection unit according to Embodiment 1.

FIG. 14 is a view (part 1) for describing the process performed by the ball detection unit according to Embodiment 1. In the example illustrated in FIG. 14, a difference image 15 includes regions 15a, 15b, 15c, 15d, and 15e. For example, it is assumed that the regions 15a, 15c, and 15e are the regions where the difference from the area defined in the template is less than the threshold value. In this case, the ball detection unit 150b detects the regions 15a, 15c, and 15e as ball candidates.

The ball detection unit 150b converts the coordinates (image frame coordinates) of each ball candidate calculated from the difference image into the global coordinates, based on the conversion table 140b. The ball detection unit 150b assigns unique candidate identification information to each ball candidate. The ball detection unit 150b registers the time, the candidate identification information, and the coordinates (global coordinates) in association with each other in the table 143a.

For example, the ball detection unit 150b compares the average coordinates of the region 15a of the difference image 15 with the first conversion table 142a to obtain the global coordinates (x11, y11) of the ball candidate. For example, it is assumed that the difference image 15 is a difference image between the image frame of the time T1 and the image frame of the time T2. The ball detection unit 150b assigns candidate identification information "B1001" to the ball candidate corresponding to the region 15a. In this case, the ball detection unit 150b registers the time T1, the candidate identification information "B 1001," and the coordinates "x11, y11" in association with each other in the table 143a. The ball detection unit 150b executes the similar process for the regions 15c and 15e of the difference image 15.

The ball detection unit 150b also executes the similar process for the image data (image frame) stored in the tables 141b to 141d of the buffer 140a, to extract a ball candidate from a difference image and register time, candidate identification information, and coordinates in association with each other in the table 143a. In addition, when multiple ball candidates in which a difference of coordinates is less than a threshold value are detected at the same time, the ball detection unit 150b executes a process of registering information of one of the ball candidates in the ball management table 140c and deleting the other ball candidates.

Subsequently, the process in which the ball detection unit 150b adds a position of a ball candidate will be described. The ball detection unit 150b predicts a position of a ball candidate based on the movement definition information 140e, to supplement information on a ball candidate that could not have been registered in the ball management table 140c. Further, the ball detection unit 150b predicts a position of a ball candidate based on the movement definition information 140e, and does not add a ball candidate when a ball candidate already exists at the predicted position.

FIG. 15 is a view (part 2) for describing the process performed by the ball detection unit according to Embodiment 1. Step S10 of FIG. 15 will be described. It is assumed that a ball candidate 18 is a ball candidate detected at a time t-2. It is assumed that a ball candidate 19 is a ball candidate detected at a time t-1. It is assumed that ball candidates 20a, 20b, and 20c are ball candidates detected at a time "t."

By taking the ball candidate 19 as a reference, the ball detection unit 150b predicts a region 21 of a movement destination of the ball candidate at the time "t," based on the shape and the speed corresponding to the event identification information defined in the movement definition information 140e. Here, as an example, it is assumed that the event identification information is preset in the ball detection unit 150b.

Step S11 of FIG. 15 will be described. When no ball candidate exists in the region 21 at the time "t," the ball detection unit 150b adds a ball candidate 20d to the region 21. The ball detection unit 150b registers information on the ball candidate 20d in the ball management table 140c. That is, the ball detection unit 150b registers candidate identification information and coordinates of the ball candidate 20d in association with the time "t" in the ball management table 140c.

The ball detection unit 150b specifies the ball candidates 20a, 20b, and 20c that are not included in the region 21 at the time "t." The ball detection unit 150b sets the lost flag for each of the ball candidates 20a, 20b, and 20c to "1" in the ball management table 140c. Further, as in step S10, when no ball candidate exists in the region 21 of the movement destination predicted by taking the ball candidate 19 of the time t-1 as a reference, the lost flag for the ball candidate 19 is set to "1."

FIG. 16 is a view (part 3) for describing the process performed by the ball detection unit according to Embodiment 1. Step S20 of FIG. 16 will be described. It is assumed that the ball candidate 18 is a ball candidate detected at the time t-2. It is assumed that the ball candidate 19 is a ball candidate detected at the time t-1. It is assumed that the ball candidates 20a, 20b, 20c, and 20f are ball candidates detected at the time "t."

By taking the ball candidate 19 as a reference, the ball detection unit 150b predicts the region 21 of the movement destination of the ball candidate at the time "t," based on the shape and the speed corresponding to the event identification information defined by the motion definition information 140e. Here, as an example, it is assumed that the event identification information is preset in the ball detection unit 150b.

Step S21 of FIG. 16 will be described. Since a ball candidate 20f exists in the region 21 at the time "t," the ball detection unit 150b does not add a ball candidate as described in step S11 of FIG. 15. The ball detection unit 150b sets the lost flag for each of the ball candidates 20a, 20b, and 20c to "1" in the ball management table 140c.

In addition, when no ball candidate exists at a previous time, the ball detection unit 150b sets the lost flag of each ball candidate detected at a current time to "1."

Referring back to FIG. 3, the player detection unit 150c is a processing unit that detects a player from each image frame. Here, descriptions will be made on the process in which the player detection unit 150c detects a player from the image data (image frames) captured by the camera 10a and stored in the table 141a of the buffer 140a. The player detection unit 150c generates a difference image between the image frame of the time T1 and the image frame of the time T2 in the table 141a. The player detection unit 150c compares the area of the region remaining on the difference image with a template defining the area of a player, and detects a region on the difference image where the difference from the area of the template is less than a threshold value, as a player.

The player detection unit 150c converts the coordinates (image frame coordinates) of the player candidate calculated from the difference image into the global coordinates, based on the conversion table 140b. The player detection unit 150c assigns unique player identification information to the player. The player detection unit 150c registers the time and the coordinates (global coordinates) corresponding to the player identification information in association with each other in the player management table 140d. The player detection unit 150c predicts the movement of the player to track the same player to be detected at another time.

The player detection unit 150c also executes the similar process for the image data (image frames) stored in the tables 141b to 141d of the buffer 140a, to extract a player from a difference image and register a time and coordinates corresponding to player identification information in association with each other in the player management table 140d.

In Embodiment 1, as an example, the player detection unit 150c generates the player management table 140d. However, the present disclosure is not limited thereto. For example, the information processing apparatus 100 may acquire the player management table 140d from another tracking apparatus that tracks a trajectory of each player who is playing a game in the game area 5.

The generation unit 150d is a processing unit that generates a ball trajectory candidate based on the ball management table 140c. The generation unit 150d registers information on the generated ball trajectory candidate in the trajectory candidate management table 140f.

Figure 17:
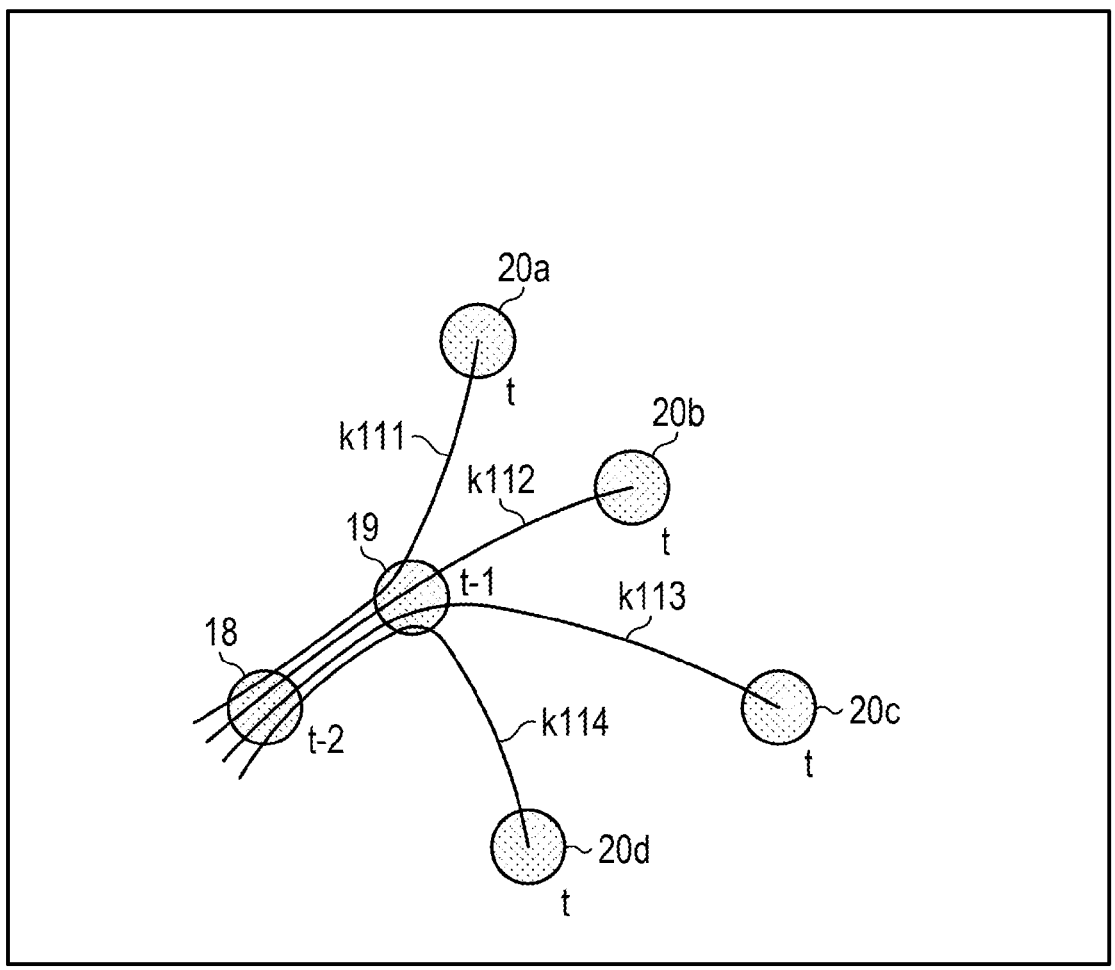
FIG. 17 is a view for describing a process performed by a generation unit according to Embodiment 1.

FIG. 17 is a view for describing the process performed by the generation unit according to Embodiment 1. For example, when the ball candidate 18 is detected at the time t-2 and the ball candidate 19 is detected at the time t-1, the generation unit 150d generates a ball trajectory candidate that connects the coordinates of the ball candidate 18 and the coordinates of the ball candidate 19 to each other. In the following descriptions, the ball trajectory candidate will be referred to as a "trajectory candidate."

When the ball candidates 20a, 20b, 20c, and 20d are detected at the time "t," the generation unit 150d generates trajectory candidates k111, k112, k113, and k114. The trajectory candidate k111 includes the ball candidates 18, 19, and 20a. The trajectory candidate k112 includes the ball candidates 18, 19, and 20b. The trajectory candidate k113 includes the ball candidates 18, 19, and 20c. The trajectory candidate k114 includes the ball candidates 18, 19, and 20d.

As described above, the generation unit 150d generates a trajectory candidate by combining the ball candidates detected at the respective times with each other. The generation unit 150d registers information of the generated trajectory candidates in the trajectory candidate management table 140f. For example, the generation unit 150d registers the trajectory candidate identification information, the total number of times of lost, the candidate identification information, and the coordinates in association with each other in the trajectory candidate management table 140f. The generation unit 150d calculates the total number of ball candidates assigned with the lost flag "1," among the ball candidates included in the trajectory candidates, as the total number of times of lost.

Referring back to FIG. 3, the trajectory determination unit 150e is a processing unit that evaluates the multiple trajectory candidates included in the trajectory candidate management table 140f and determines a ball trajectory. For example, the trajectory determination unit 150e sequentially executes a process of adding a trajectory candidate and a process of determining a ball trajectory from the multiple trajectory candidates.

The process in which the trajectory determination 150e adds a trajectory candidate will be described. The trajectory determination unit 150e compares each trajectory candidate with a movement trajectory of a player, and adds a trajectory obtained by adding the movement trajectory of the player to the trajectory candidate overlapping with the movement trajectory of the player, as a new trajectory candidate.

FIG. 18 is a view (part 1) for describing the process performed by the trajectory determination unit according to Embodiment 1. As illustrated in step S30 of FIG. 18, trajectory candidates k121, k122, and k123 exist. Further, it is assumed that a movement trajectory p101 is a movement trajectory of a specific player. In the example illustrated in FIG. 18, the trajectory candidate k121 and the movement trajectory p101 overlap with each other at R1. The trajectory candidate k122 and the movement trajectory p101 overlap with each other at R2. Here, it is assumed that the difference between the time of the ball candidate of k121 and the time of the player of the movement trajectory p101 which correspond to R1 is less than a threshold value. It is assumed that the difference between the time of the ball candidate of k122 and the time of the player of the movement trajectory p101 which correspond to R2 is less than a threshold value.

Step S31 of FIG. 18 will be described. The trajectory determination unit 150e newly adds a trajectory candidate k124 by interpolating the movement trajectory between R1 and R2 as a trajectory candidate. For example, the position of the player on the movement trajectory between R1 and R2 is set as a position of a ball candidate. The trajectory determination unit 150e registers information of the added trajectory candidate in the trajectory management table 140g. The lost flag of the ball candidate corresponding to the position of the player is set to "0."

Further, the trajectory determination unit 150e generates the corresponding information based on the movement trajectory between R1 and R2. The corresponding information includes player identification information of the player corresponding to the movement trajectory between R1 and R2 and information of the time period from R1 to R2. For example, the trajectory determination unit 150e associates the trajectory candidate k124 with the information of the generated movement trajectory.

Figure 19:
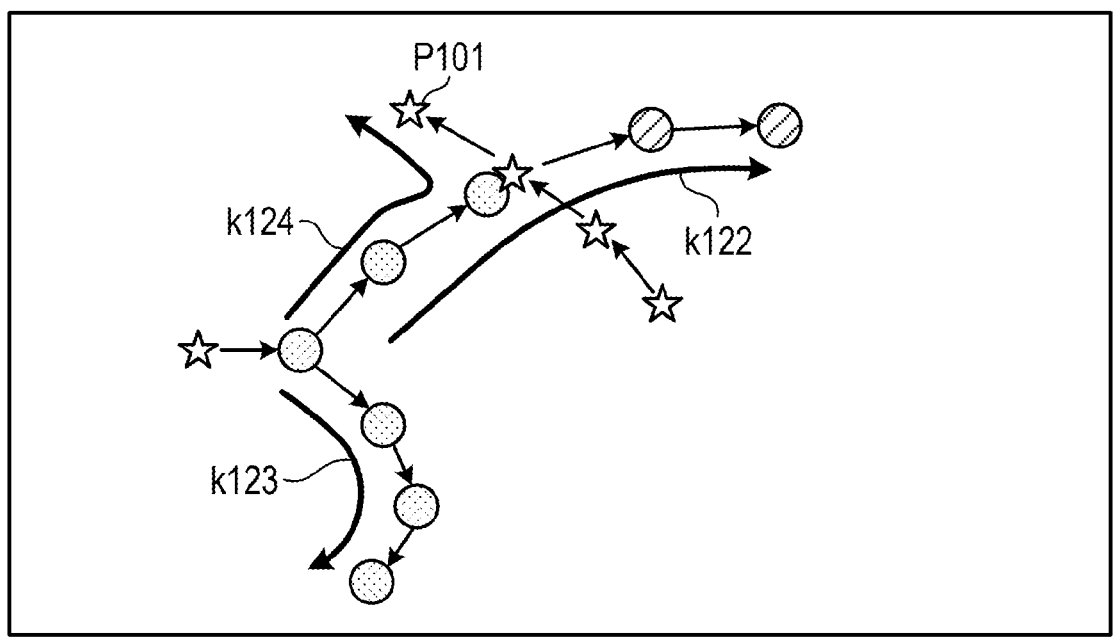
FIG. 19 is a view (part 2) for describing the process performed by the trajectory determination unit according to Embodiment 1.

Subsequently, the process in which the trajectory determination unit 150e determines a ball trajectory from the multiple ball trajectory candidates will be described. FIG. 19 is a view (part 2) for describing the process performed by the trajectory determination unit according to Embodiment 1. In the example illustrated in FIG. 19, trajectory candidates k122, k123, and k124 exist. The trajectory candidate k124 is considered as a trajectory candidate in a case where the ball is passed from a specific player to another player. The trajectory candidate k122 is considered as a trajectory candidate in a case where the ball from the specific player crosses another player and proceeds forward past the another player. The trajectory candidate k123 is a trajectory candidate in a case where the ball moves in the right direction from the specific player.

When the multiple trajectory candidates include a trajectory candidate in which the total number of times of lost is equal to or more than a threshold value, the trajectory determination unit 150e deletes the trajectory candidate in which the total number of times of lost is equal to or more than the threshold value. Further, the trajectory determination unit 150e deletes a trajectory candidate which does not overlap with the movement trajectory of the player for a specific time or longer (a predetermined time width), among the trajectory candidates in which the total number of times of lost is less than the threshold value. By executing the process of deleting the trajectory candidates as described above, the trajectory determination unit 150e determines the finally remaining trajectory candidate as a correct ball trajectory.

For example, in FIG. 19, when the total number of times of lost in the trajectory candidate k122 is equal to or more than the threshold value, the trajectory determination unit 150e deletes the trajectory candidate k122. In addition, since the trajectory candidate k123 does not overlap with the movement trajectory of the player for the specific time or longer, the trajectory determination unit 150e deletes the trajectory candidate k123. In this case, the trajectory determination unit 150e determines the remaining trajectory candidate k124 as a ball trajectory.

The trajectory determination unit 150e assigns unique trajectory identification information to the ball trajectory, and registers the information of the ball trajectory in the trajectory management table 140g. For example, as described in FIG. 12, the information of the ball trajectory includes the trajectory identification information, the candidate identification information, the coordinates, and the corresponding information.

Referring back to FIG. 3, the statistical information generation unit 150f is a processing unit that generates the statistical information 140h based on the player management table 140d and the trajectory management table 140g. For example, the statistical information generation unit 150f calculates a momentum of a player, a dribbling distance, and the number of times of passing, as statistical information.

Descriptions will be made on an example of the process in which the statistical information generation unit 150f calculates the momentum of a player. The statistical information generation unit 150f calculates the momentum by integrating a movement distance between times with reference to the player management table 140d. For example, when the coordinates of a player at the time "t" is $(x_t, y_t)$, the momentum of the player from the time "t" to a time t+n is calculated by an equation (1). In the equation (1), the time "t" is a time when the game is started, and the time t+n is a time when the game is ended.

(Equation 1)

$$\text{MOMENTUM} = \sum_{i=t}^{t+n} \sqrt{(x_{i+1} - x_i)^2 + (y_{i+1} - y_i)^2} \quad (1)$$

Descriptions will be made on an example of the process in which the statistical information generation unit 150f calculates the dribbling distance of a player. The statistical information generation unit 150f refers to the corresponding information of the trajectory management table 140g, to specify the player identification information and the time period when the player corresponding to the player identification information moves along with the ball. The statistical information generation unit 150f compares the player identification information and the time period when the player moves along with the ball, with the player management table 140d, to specify the coordinates of each time when the player moves along the ball. The statistical information generating unit 150f calculates the dribbling distance of the player by an equation (2). In the equation (2), a time "ta" is a starting time of the time period when the player moves along with the ball, and a time "na" is an ending time of the time period when the player moves along with the ball. In addition, when there exist multiple time periods when the player continuously dribbles the ball, the statistical information generation unit 150f calculates and sums the dribble distances of the respective time periods, to obtain the final dribbling distance.

(Equation 2)

$$\text{DRIBBLE DISTANCE} = \sum_{i=ta}^{ta+na} \sqrt{(x_{i+1} - x_i)^2 + (y_{i+1} - y_i)^2} \quad (2)$$

Descriptions will be made on an example of the process in which the statistical information generation unit 150f calculates the number of times of passing by a player. For example, the statistical information generation unit 150f refers to the corresponding information of the trajectory management table 140g, to calculate the number of times of passing by a player based on a change in the player identification information. For example, it is assumed that in the corresponding information of specific trajectory identification information, the time period corresponding to the player identification information "H101" is a time period of Ta1 to Ta10, and a time period corresponding to other player identification information starts from Tb15. When the time period from the time Ta10 to the time Tb15 is included within a predetermined time period, the statistical information generation unit 150f increments the number of times of passing by the player having the player identification information "H101" by 1. The statistical information generation unit 150f repeats the process described above to calculate the number of times of passing by the player.

The statistical information generation unit 150f calculates the momentum, the dribbling distance, and the number of times of passing for each player, and registers the momentum, the dribbling distance, and the number of times of passing in association with the player identification information of the player in the statistical information 140h.

The output unit 150g is a processing unit that outputs the information of the trajectory management table 140g and the information of the statistical information 140h to the display unit 130 to be displayed on the display unit 130. Further, the output unit 150g causes the display unit 130 to display the momentum, the number of times of passing, and the dibbling distance which correspond to the player, as the statistical information. The output unit 150g may cause the display unit 130 to display the statistical information generated for each player in association with the movement trajectory of the player.

In addition, the output unit 150g may store the information of the trajectory management table 140g and the information of the statistical information 140h in an external database (DB). In addition, the output unit 150g may compress the information of the trajectory management table 140g and the information of the statistical information 140h, and store the compressed information in the DB.

Figure 20:
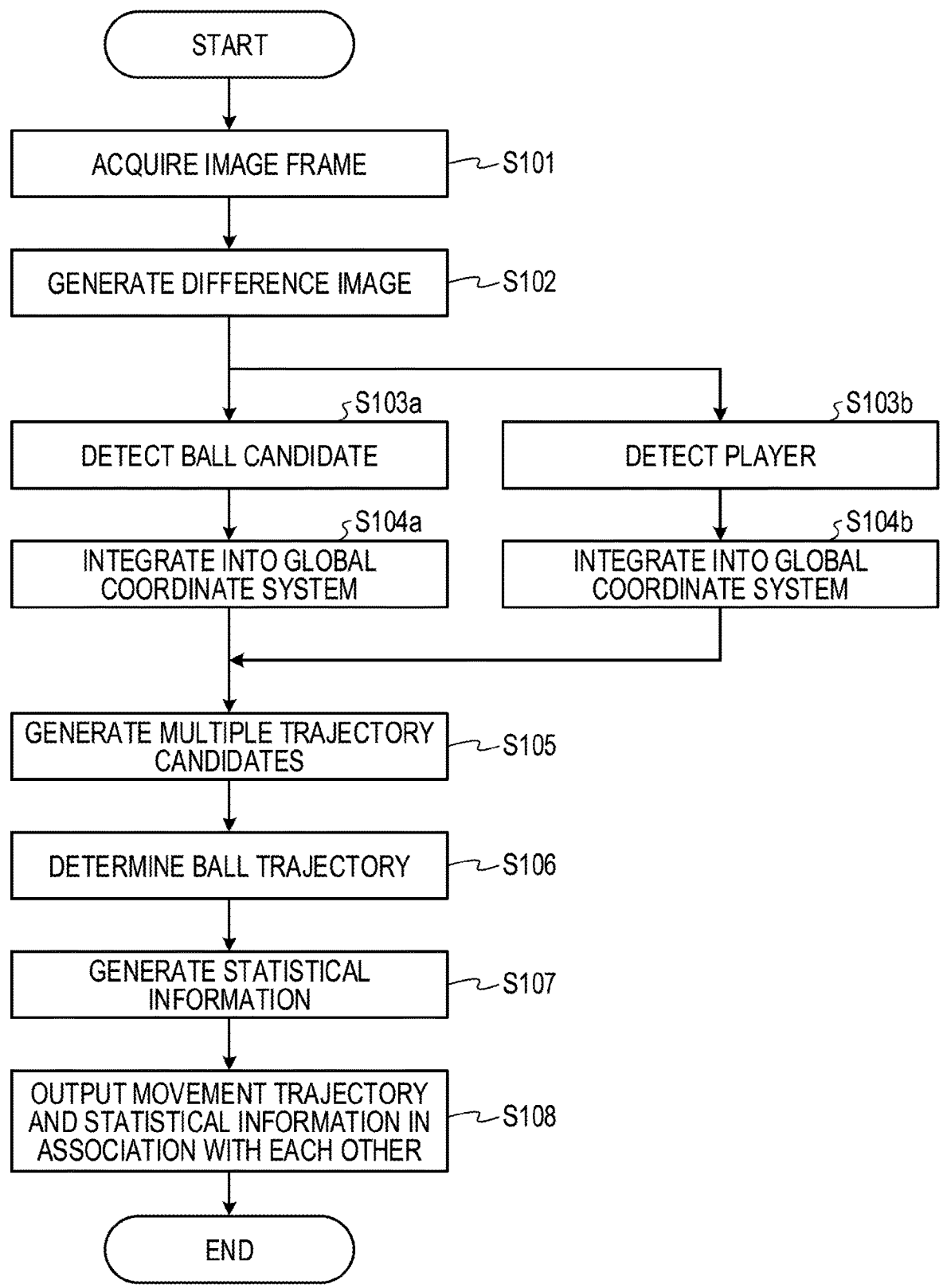
FIG. 20 is a flowchart illustrating a procedure of processes performed by the information processing apparatus according to Embodiment 1.

Next, descriptions will be made on a procedure of the processes by the information processing apparatus 100 according to Embodiment 1. FIG. 20 is a flowchart illustrating a procedure of the processes by the information processing apparatus according to Embodiment 1. As illustrated in FIG. 20, the reception unit 150a of the information processing apparatus 100 acquires the image frame from the camera 10 and stores the image frame in the buffer 140a (step S101).

The ball detection unit 150b (and the player detection unit 150c) of the information processing apparatus 100 acquires two adjacent image frames from the buffer 140a, and generates a difference image (step S102). The ball detection unit 150b detects a ball candidate (step S103a) and integrates the coordinates of the ball region into the global coordinate form (step S104a), to proceed to step S105.

The player detection unit 150c detects a player (step S103b) and integrates the coordinates of the player into the global coordinate form (step S104b), to proceed to step S105.

The generation unit 150d of the information processing apparatus 100 generates multiple trajectory candidates (step S105). The trajectory determination unit 150e of the information processing apparatus 100 determines a ball trajectory from the multiple trajectory candidates (step S106). The statistical information generation unit 150f of the information processing apparatus 100 generates the statistical information 140h based on the trajectory management table 140g (step S107). The output unit 150g of the information processing apparatus 100 outputs the movement trajectory of each player and the statistical information in association with each other to the display unit 130 (step S108).

Next, effects of the information processing apparatus 100 according to Embodiment 1 will be described. The information processing apparatus 100 combines the ball candidates of the respective times that are detected based on the difference images and the movement definition information 140e with each other, to detect the multiple trajectory candidates, and evaluates the detected multiple trajectory candidates to specify a ball trajectory. In addition, when the ball trajectory is interrupted, the information processing apparatus 100 interpolates between the starting point and the ending point of the interruption according to the movement trajectory of the player moving from the starting point to the ending point. As described above, since the player is regarded as being moving along with the ball during the interruption of the ball trajectory, the interrupted ball trajectory is interpolated with the movement trajectory of the player so that the ball tracking may be continuously performed.

The information processing apparatus 100 performs the process of estimating the position of the ball candidate on the current image frame based on the position of the ball candidate detected from the previous image frame and the movement definition information 140e, and adding a ball candidate when no ball candidate exists at the estimated position. As a result, it is possible to temporarily add a ball candidate which is not included in the image frame.

The information processing apparatus 100 assigns the lost flag to the ball candidate which is not included in the predetermined range based on the position estimated with reference to the movement definition information 140e, and deletes the trajectory candidate in which the number of times of lost is equal to or more than the threshold value based on the lost flag. Since the lost flag is assigned to the ball candidate which does not conform to the movement definition of the ball, the ball trajectory corresponding to the movement definition of the ball may be determined as a trajectory candidate.

Embodiment 2

Next, an information processing apparatus according to Embodiment 2 will be described. Although not illustrated, it is assumed that the information processing apparatus according to Embodiment 2 is connected to the cameras 10a, 10b, 10c, and 10d as in Embodiment 1. The descriptions of the cameras 10a to 10d are similar to those in Embodiment 2, and thus, will be omitted.

Figure 21:
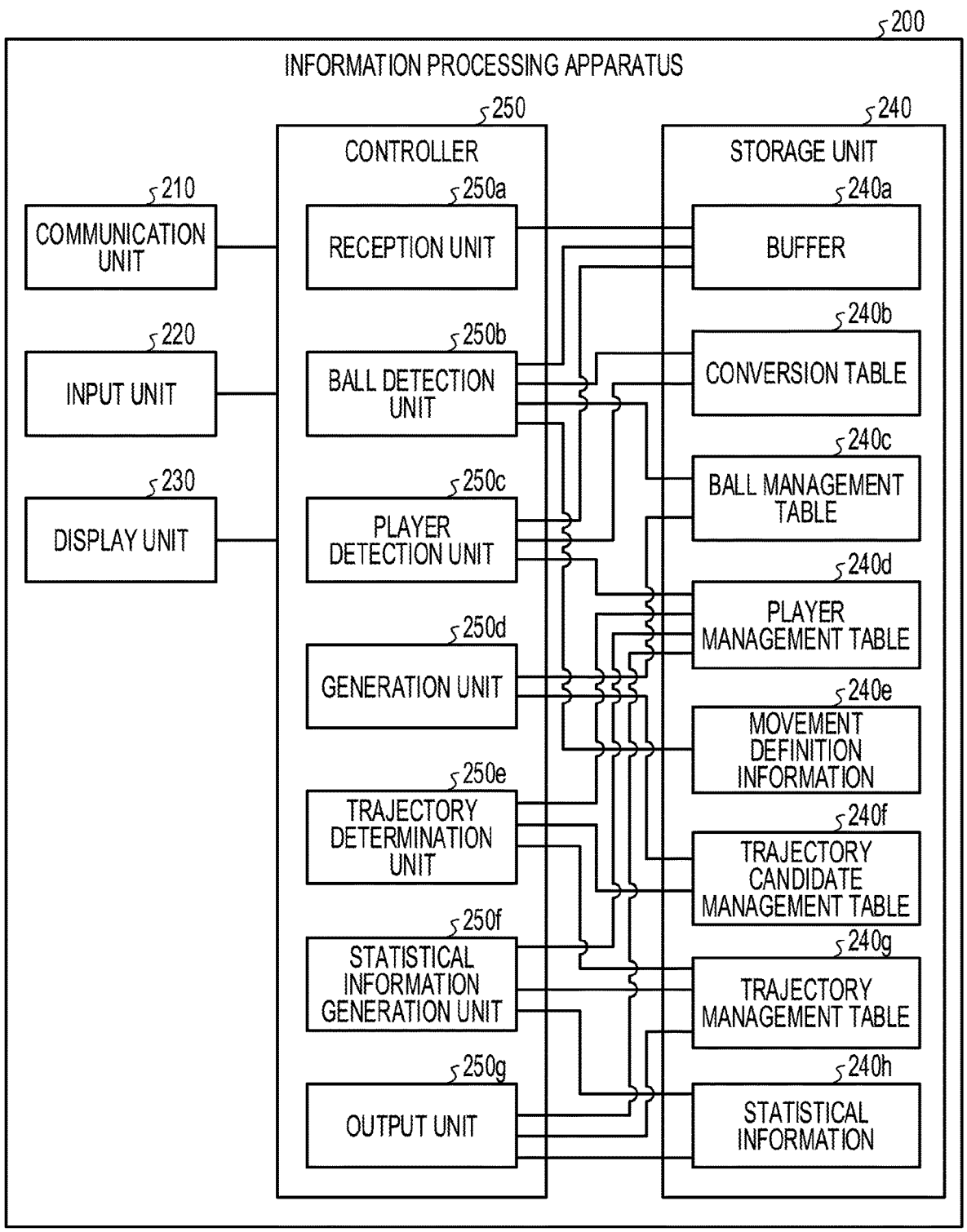
FIG. 21 is a view illustrating a configuration of an information processing apparatus according to Embodiment 2.

FIG. 21 is a view illustrating a configuration of the information processing apparatus according to Embodiment 2. As illustrated in FIG. 21, an information processing apparatus 200 includes a communication unit 210, an input unit 220, a display unit 230, a storage unit 240, and a controller 250.

The descriptions of the communication unit 210, the input unit 220, and the display unit 230 are similar to the descriptions of the communication unit 110, the input unit 120, and the display unit 130 in Embodiment 1.

The storage unit 240 includes a buffer 240a, a conversion table 240b, a ball management table 240c, a player management table 240d, movement definition information 240e, a trajectory candidate management table 240f, a trajectory management table 240g, and statistical information 240h. The storage unit 240 corresponds to a semiconductor memory device such as a RAM, a ROM or a flash memory, or a storage device such as an HDD.

The descriptions of the buffer 240a, the conversion table 240b, the ball management table 240c, the player management table 240d, and the movement definition information 240e are similar to the descriptions of the information 140a to 140e in Embodiment 1. Further, the descriptions of the trajectory candidate management table 240f, the trajectory management table 240g, and the statistical information 240h are similar to the descriptions of the information 140f to 140h in Embodiment 1.

The controller 250 includes a reception unit 250a, a ball detection unit 250b, a player detection unit 250c, a generation unit 250d, a trajectory determination unit 250e, a statistical information generation unit 250f, and an output unit 250g. The controller 250 is implemented by, for example, a CPU or an MPU. In addition, the controller 250 may be implemented by a hard-wired logic such as an ASIC or an FPGA.

The descriptions of the reception unit 250a, the ball detection unit 250b, the player detection unit 250c, and the generation unit 250d are similar to the descriptions of the reception unit 150a, the ball detection unit 150b, the player detection unit 150c, and the generation unit 150d in Embodiment 1. Further, the descriptions of the statistical information generation unit 250f and the output unit 250g are similar to the descriptions of the statistical information generation unit 150f and the output unit 150g in Embodiment 1.

The trajectory determination unit 250e is a processing unit that evaluates the multiple trajectory candidates included in the trajectory candidate management table 240f and determines a ball trajectory. For example, the trajectory determination unit 250e sequentially executes a process of adding a trajectory candidate and a process of determining a ball trajectory from the multiple trajectory candidates. Here, since the process of adding a trajectory candidate by the trajectory determination unit 250e is similar to the process of adding a trajectory candidate by the trajectory determination unit 150e as described in Embodiment 1, descriptions thereof will be omitted.

Figure 22:
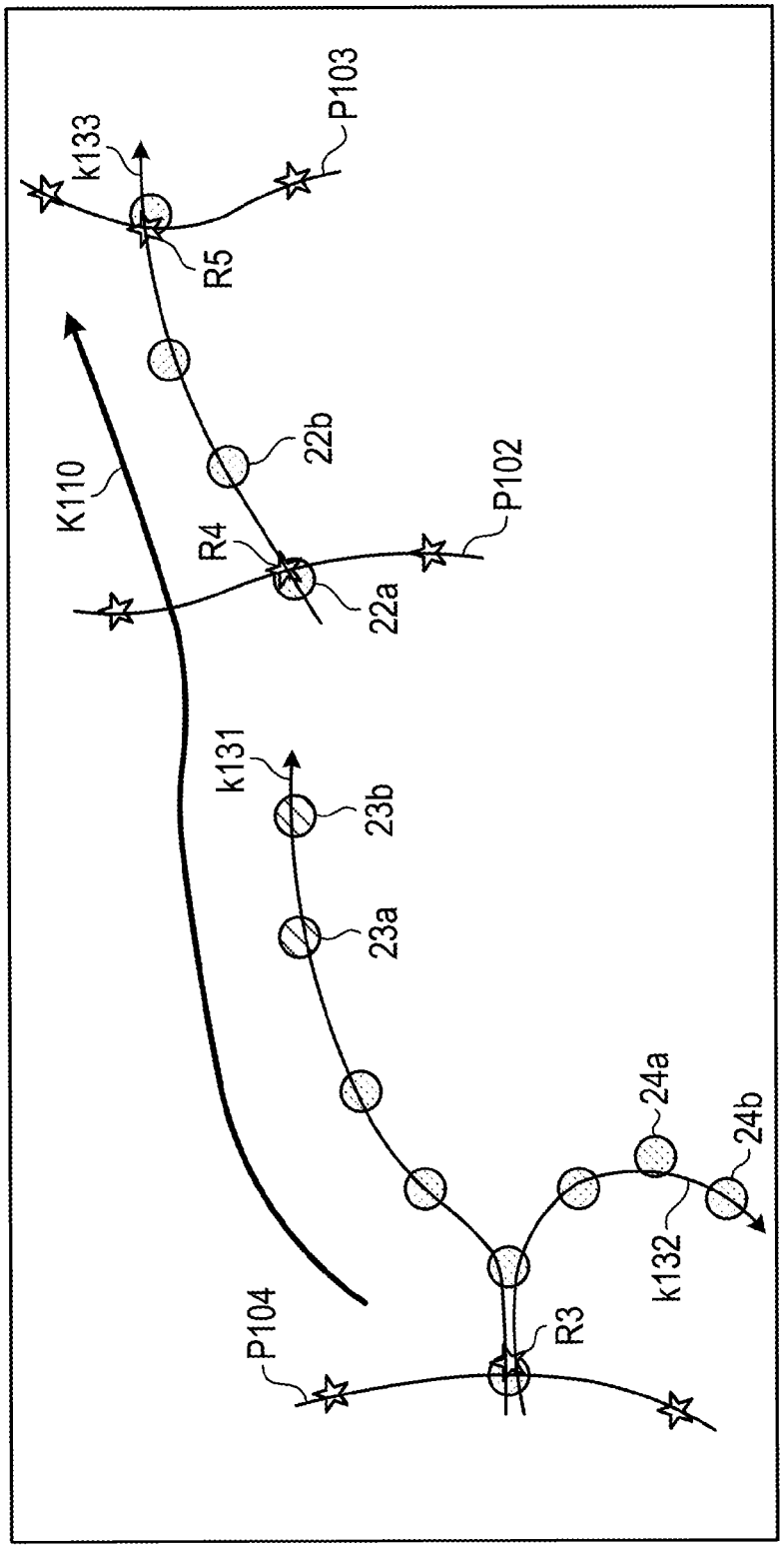
FIG. 22 is a view for describing a process performed by a trajectory determination unit according to Embodiment 2.

Descriptions will be made on the process in which the trajectory determination unit 250e determines a ball trajectory from the multiple trajectory candidates. FIG. 22 is a view for describing the process performed by the trajectory determination unit according to Embodiment 2. As illustrated in FIG. 22, trajectory candidates k131, k132, and k133 exist. Further, movement trajectories p102, p103, and p104 are movement trajectories of players, respectively.

The trajectory determination unit 250e compares the trajectory candidates k131, k132, and k133 and the movement trajectories p102, p103, and p104 with each other, and specifies portions where the trajectory candidates and the movement trajectories overlap with each other. In the example illustrated in FIG. 22, the trajectory candidates and the movement trajectories overlap with each other at R3, R4, and R5. Here, it is assumed that the times of the ball candidates and the players which correspond to R3, R4, and R5 also overlap with each other, as in R1 and R2 described in FIG. 18.

The trajectory determination unit 250e determines a trajectory candidate sandwiched between the overlapping portions, among the multiple trajectory candidates, as a ball trajectory. For example, in FIG. 22, the trajectory determination unit 250e determines the movement trajectory k133 sandwiched between the overlapping portions R4 and R5, as a ball trajectory. Further, the trajectory determination unit 250e deletes the portions of the trajectory candidate which protrude from the sandwiched portion.

The trajectory determination unit 250e compares the determined trajectory candidate and the remaining undetermined trajectory candidates with each other, and selects a trajectory candidate to be connected to the determined trajectory candidate. Here, it is assumed that a ball candidate corresponding to the starting point of the determined trajectory candidate k133 is the ball candidate 22a, and a ball candidate of the subsequent time is the ball candidate 22b. It is assumed that a ball candidate of the ending point of the undetermined trajectory candidate k131 is the ball candidate 23b, and a ball candidate of the previous time is the ball candidate 23a. It is assumed that a ball candidate of the ending point of the undetermined trajectory candidate k132 is the ball candidate 24b, and a ball candidate of the previous time is the ball candidate 24a.

The trajectory determination unit 250e selects a trajectory candidate having a ball candidate of an ending point of which the distance from the ball candidate 22a is less than a threshold value and of which the time difference from the ball candidate 22a is less than a threshold value. For example, when the distance between the ball candidates 22a and 23b is less than the threshold value and the time difference between the ball candidates is less than the threshold value, the trajectory determination unit 250e selects the trajectory candidate k131. Meanwhile, when the distance between the ball candidates 22a and 24b is equal to or more than the threshold value or the time difference between the ball candidates is equal to or larger than the threshold value, the trajectory determination unit 250e does not select the trajectory candidate k132.

Subsequently, the trajectory determination unit 250e compares the direction from the ball candidate 22a to the ball candidate 22b of the determined trajectory candidate k133 and the direction from the ball candidate 23a to the ball candidate 23b of the selected trajectory candidate k131 with each other. When the angle formed by the respective directions is less than a threshold value, the trajectory determination unit 250e generates a trajectory K110 by connecting the trajectory candidates k131 and k133 to each other, and registers the trajectory K110 as a ball trajectory in the trajectory management table 240g.

When the angle formed by the respective directions is equal to or larger than the threshold value, the trajectory determination unit 250e registers the determined trajectory k133 in the trajectory management table 240g.

Next, effects of the information processing apparatus 200 according to Embodiment 2 will be described. The information processing apparatus 200 executes the process of evaluating the multiple trajectory candidates to determine a ball trajectory, comparing the determined trajectory with the trajectory candidates, and connecting the selected trajectory candidate to the determined trajectory so as to generate a trajectory. As a result, even in a case where the ball is hidden by the player so that no ball candidate is detected or the ball does not move to the position estimated based on the movement definition information 240e, the ball trajectory may be continuously tracked.

Embodiment 3

Next, an information processing apparatus according to Embodiment 3 will be described. Although not illustrated, it is assumed that the information processing apparatus according to Embodiment 3 is connected to the cameras 10a, 10b, 10c, and 10d as in Embodiment 1. The descriptions of the cameras 10a to 10d are similar to those in Embodiment 1, and thus, will be omitted.

Figure 23:
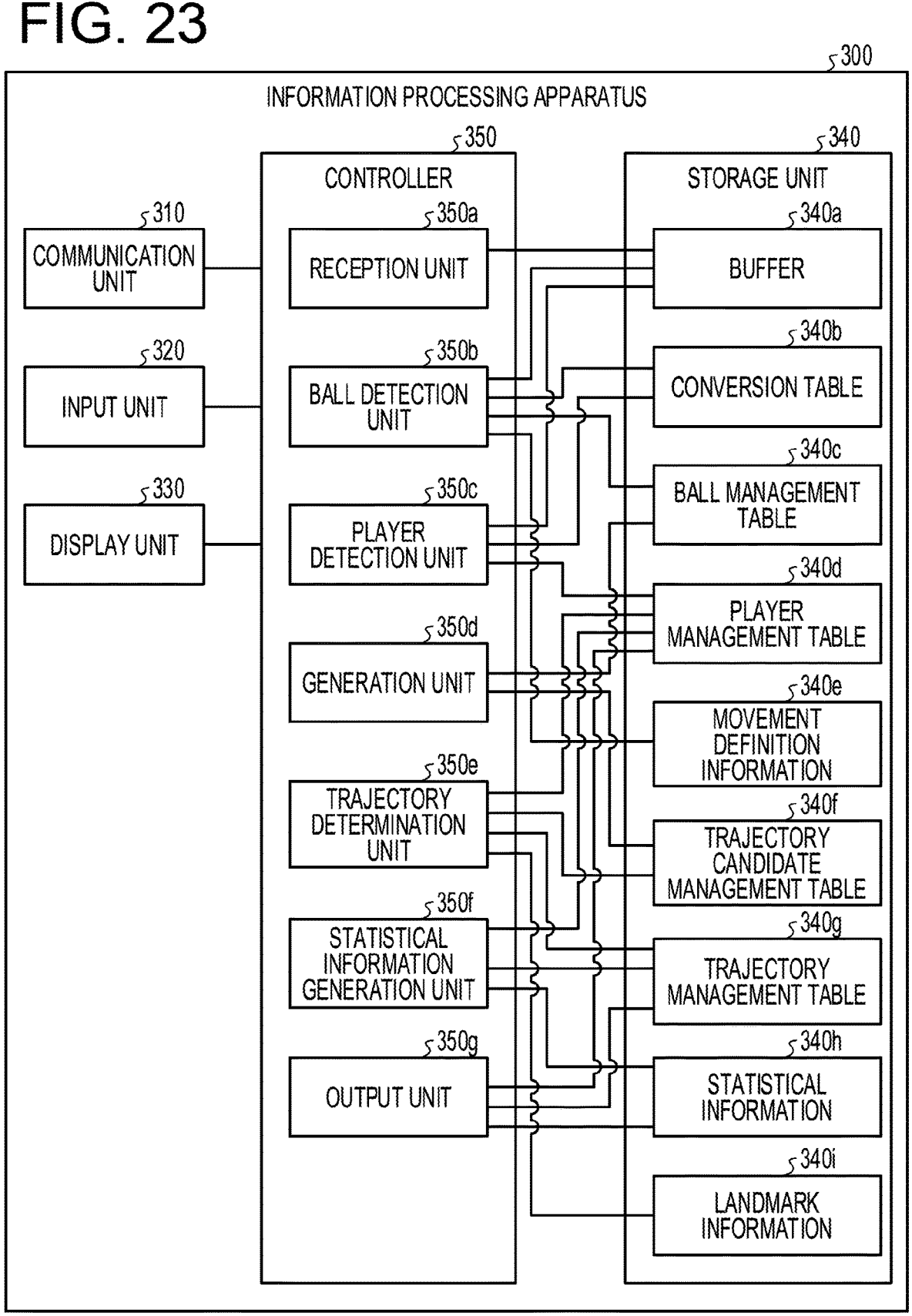
FIG. 23 is a view illustrating a configuration of an information processing apparatus according to Embodiment 3.

FIG. 23 is a view illustrating a configuration of the information processing apparatus according to Embodiment 3. As illustrated in FIG. 23, an information processing apparatus 300 includes a communication unit 310, an input unit 320, a display unit 330, a storage unit 340, and a controller 350.

The descriptions of the communication unit 310, the input unit 320, and the display unit 330 are similar to the descriptions of the communication unit 110, the input unit 120, and the display unit 130 in Embodiment 1.

The storage unit 340 includes a buffer 340a, a conversion table 340b, a ball management table 340c, a player management table 340d, movement definition information 340e, and a trajectory candidate management table 340f. The storage unit 340 includes a trajectory management table 340g, statistical information 340h, and landmark information 340i. The storage unit 340 corresponds to a semiconductor memory device such as a RAM, a ROM or a flash memory, or a storage device such as an HDD.

The descriptions of the buffer 340a, the conversion table 340b, the ball management table 340c, the player management table 340d, and the motion definition information 340e are similar to the descriptions of the information 140a to 140e in Embodiment 1. Further, the descriptions of the trajectory candidate management table 340f, the trajectory management table 340g, and the statistical information 340h are similar to the descriptions of the information 140f to 140h in Embodiment 1.

The landmark information 340i holds information of a landmark present on the game area 5. The landmark is an indication of the game area and is, for example, each line of the game area 5.

Figures 24, 25:
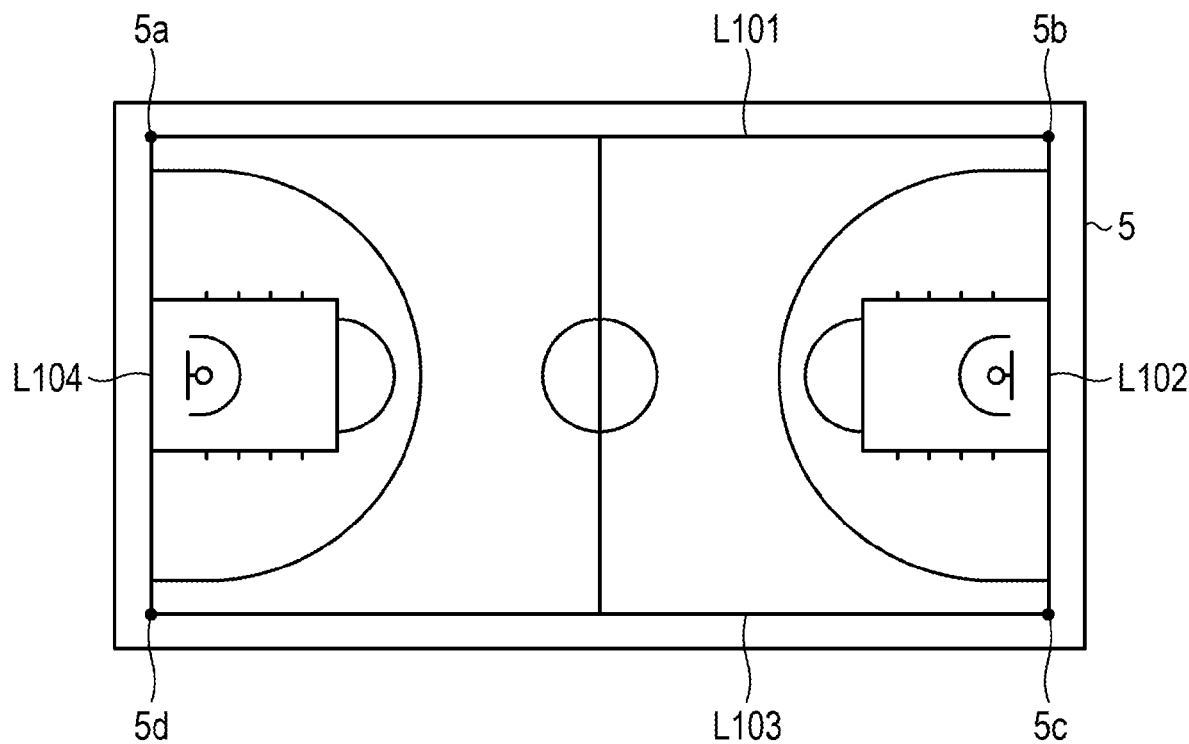
FIG. 24 is a view for describing an example of a landmark.
FIG. 25 is a view illustrating an example of a data structure of landmark information.

FIG. 24 is a view for describing an example of the landmark. As illustrated in FIG. 24, the game area 5 includes landmarks L101, L102, L103, and L104. The landmark L101 is a court line interconnecting points 5a and 5b. The landmark L102 is a court line interconnecting points 5b and 5c. The landmark L103 is a court line interconnecting points 5c and 5d. The landmark L104 is a court line interconnecting points 5d and 5a.

In sports, the movement of a ball does not indicate only the movement from a player to another player. For example, a player may shoot a ball or kick out a ball to the outside during the game. In this case, the trajectory of the ball crosses each of the landmarks (lines) L101 to L104. Thus, the information processing apparatus 300 determines a trajectory candidate crossing each of the landmarks L101 to L104 as a ball trajectory.

FIG. 25 is a view illustrating an example of a data structure of landmark information. As illustrated in FIG. 25, in landmark information 340i, landmark identification information, starting point coordinates, and ending point coordinates are associated with each other. The landmark identification information is information for uniquely identifying a landmark. The starting point coordinates and the ending point coordinates indicate coordinates of the starting point and the ending point of a landmark.

Referring back to FIG. 23, the controller 350 includes a reception unit 350a, a ball detection unit 350b, a player detection unit 350c, a generation unit 350d, a trajectory determination unit 350e, a statistical information generation unit 350f, and an output unit 350g. The controller 350 is implemented by, for example, a CPU or an MPU. In addition, the controller 350 may be implemented by a hard-wired logic such as ASIC or FPGA.

The descriptions of the reception unit 350a, the ball detection unit 350b, the player detection unit 350c, and the generation unit 350d are similar to the descriptions of the reception unit 150a, the ball detection unit 150b, the player detection unit 150c, and the generation unit 150d in Embodiment 1. Further, the descriptions of the statistical information generation unit 350f and the output unit 350g are similar to the descriptions of the statistical information generation unit 150f and the output unit 150g in Embodiment 1.

The trajectory determination unit 350e is a processing unit that evaluates the multiple trajectory candidates included in the trajectory candidate management table 340f and determines a ball trajectory. For example, the trajectory determination unit 350e sequentially executes a process of adding a trajectory candidate and a process of determining a ball trajectory from the multiple trajectory candidates. Here, since the process of adding a trajectory candidate by the trajectory determination unit 350e is similar to the process of adding a trajectory candidate by the trajectory determination unit 150e as described in Embodiment 1, descriptions thereof will be omitted.

Figure 26:
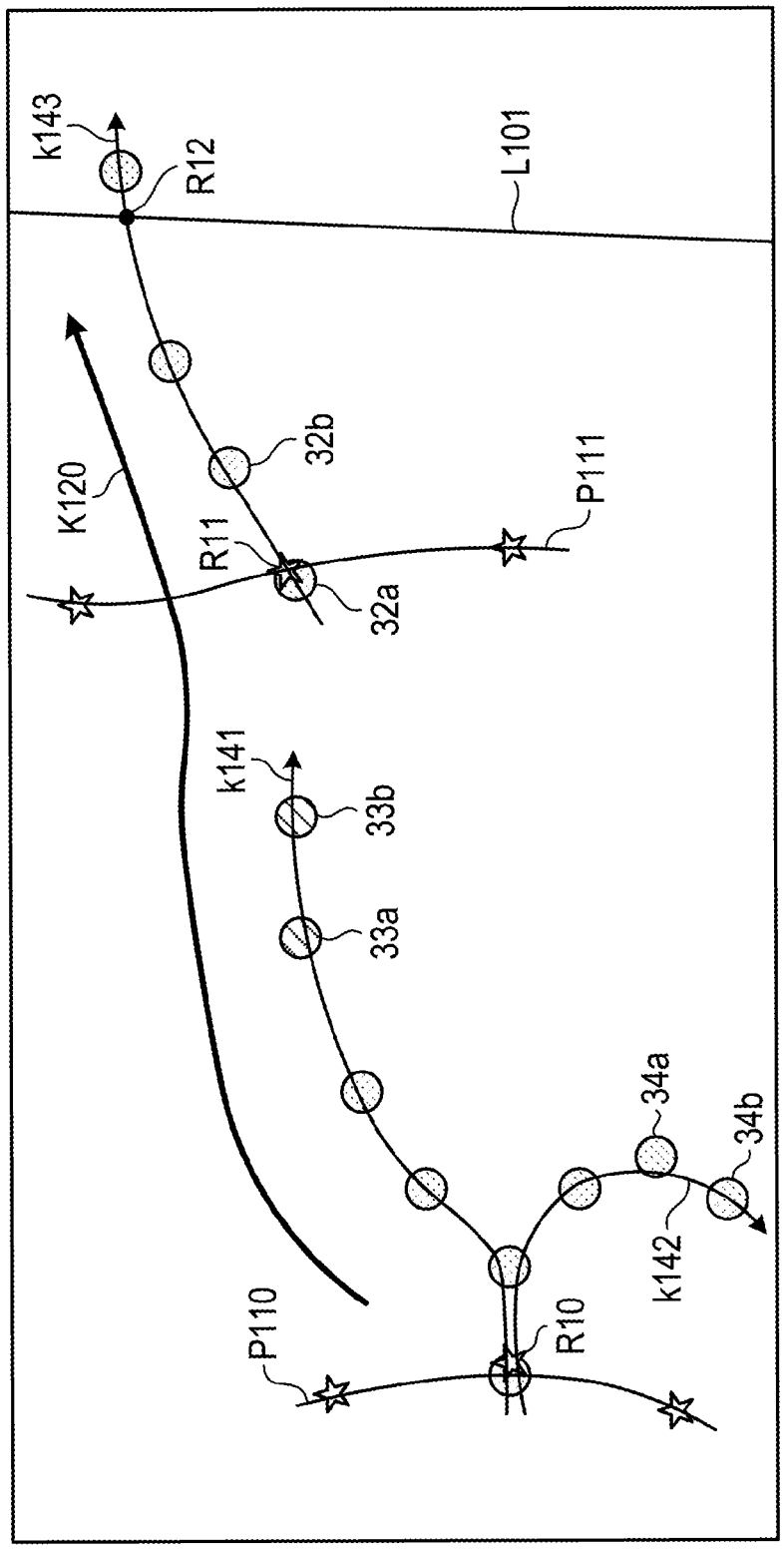
FIG. 26 is a view for describing a process performed by a trajectory determination unit according to Embodiment 3.

Descriptions will be made on the process in which the trajectory determination unit 350e determines a ball trajectory from the multiple trajectory candidates. FIG. 26 is a view for describing the process performed by the trajectory determination unit according to Embodiment 3. As illustrated in FIG. 26, trajectory candidates k141, k142, and k143 exist. It is assumed that movement trajectories p110 and p111 are movement trajectories of players, respectively. In addition, FIG. 26 includes the landmark L101.

The trajectory determination unit 350e compares the trajectory candidates k141, k142, and k143 and the movement trajectories p110 and p111 with each other, and specifies portions where the trajectory candidates and the movement trajectories overlap with each other. In the example illustrated in FIG. 26, the trajectory candidates and the movement trajectories overlap with each other at R10 and R11. Here, it is assumed that the times of the ball candidates and the players corresponding to R10 and R11 also overlap with each other, as in R1 and R2 described in FIG. 18.

In addition, the trajectory determination unit 350e compares each of the trajectory candidates k141 to k143 and the landmark L101 with each other, and specifies a portion where each trajectory candidate and the landmark overlap with each other. In the example illustrated in FIG. 26, a trajectory candidate and the landmark L101 overlap with each other at R12.

The trajectory determination unit 350e determines a trajectory candidate sandwiched between the portion where the trajectory candidate and the movement trajectory overlap with each other and the portion where the trajectory candidate and the landmark overlap with each other, among the multiple trajectory candidates, as a ball trajectory. For example, in FIG. 26, the trajectory determination unit 350e determines the movement trajectory k143 sandwiched between the overlapping portions R11 and R12 as a ball trajectory.

The trajectory determination unit 350e compares the determined trajectory candidate and the remaining undetermined trajectory candidates with each other, and selects a trajectory candidate to be connected to the determined trajectory candidate. Here, it is assumed that a ball candidate corresponding to the starting point of the determined trajectory candidate k143 is the ball candidate 32a, and a ball candidate of the subsequent time is the ball candidate 32b. It is assumed that a ball candidate of the ending point of the undetermined trajectory candidate k141 is the ball candidate 33b, and a ball candidate of the previous time is the ball candidate 33a. It is assumed that a ball candidate of the ending point of the undetermined trajectory candidate k142 is the ball candidate 34b, and the ball candidate of the previous time is the ball candidate 34a.

The trajectory determination unit 350e selects a trajectory candidate having a ball candidate of an ending point of which the distance from the ball candidate 32a is less than a threshold value and of which the time difference from the ball candidate 32a is less than a threshold value. For example, when the distance between the ball candidates 32a and 33b is less than the threshold value, and the time difference between the ball candidates is less than the threshold value, the trajectory determination unit 350e selects the trajectory candidate k141. Meanwhile, when the distance between the ball candidates 32a and 34b is equal to or more than the threshold value or the time difference between the ball candidates is equal to or larger than the threshold value, the trajectory determination unit 350e does not select the trajectory candidate k142.

Subsequently, the trajectory determination unit 350e compares the direction from the ball candidate 32a to the ball candidate 32b of the determined trajectory candidate k143 and the direction from the ball candidate 33a to the ball candidate 33b of the selected trajectory candidate k141 with each other. When the angle formed by the respective directions is less than a threshold value, the trajectory determining unit 350e generates a trajectory K120 by connecting the trajectory candidates k141 and k143 to each other, and registers the trajectory K120 as a ball trajectory in the trajectory management table 340g.

When the angle formed by the respective directions is equal to or larger than the threshold value, the trajectory determination unit 350e registers the determined trajectory k143 in the trajectory management table 340g.

Next, effects of the information processing apparatus 300 according to Embodiment 3 will be described. The information processing apparatus 300 executes the process of determining a ball trajectory using the landmark, comparing the determined trajectory with the trajectory candidates, and connecting the selected trajectory candidate to the determined trajectory so as to generate a trajectory. As a result, even in a case where the ball is hidden by a player so that no ball candidate is detected, or the ball does not move to the position estimated based on the motion definition information 340e, the ball trajectory may be continuously tracked. Further, in addition to the simple movement of the ball passed between players, the ball trajectory according to kicking out or shooting may also be tracked, so that the statistical information 340h may be generated with an improved accuracy.

Embodiment 4

Next, an information processing apparatus according to Embodiment 4 will be described. Although not illustrated, it is assumed that the information processing apparatus according to Embodiment 4 is connected to the cameras 10a, 10b, 10c, and 10d as in Embodiment 1. The descriptions of the cameras 10a to 10d are similar to those in Embodiment 1, and thus, will be omitted.

Figure 27:
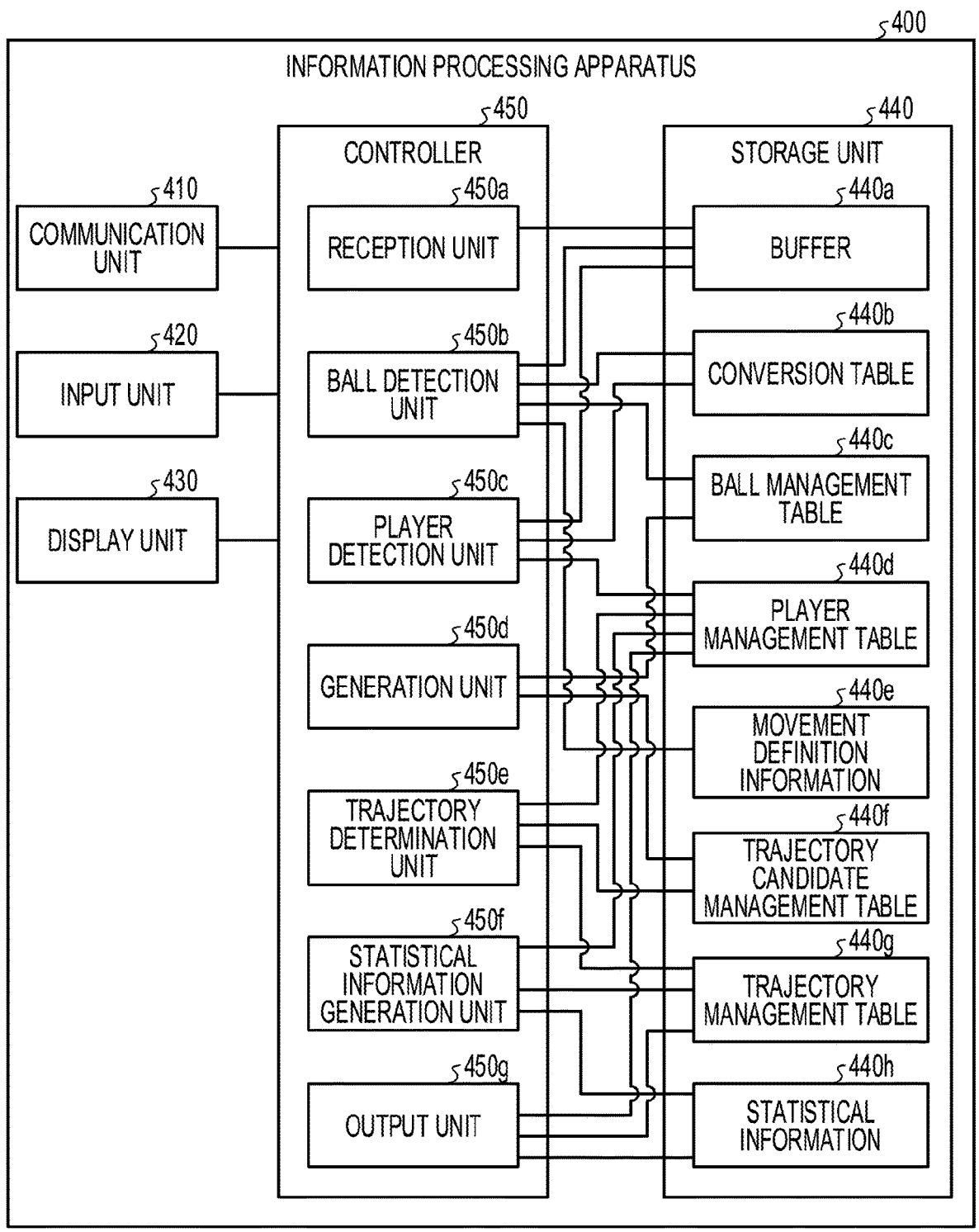
FIG. 27 is a view illustrating a configuration of an information processing apparatus according to Embodiment 4.

FIG. 27 is a view illustrating a configuration of the information processing apparatus according to Embodiment 4. As illustrated in FIG. 27, the information processing apparatus 400 includes a communication unit 410, an input unit 420, a display unit 430, a storage unit 440, and a controller 450.

The descriptions of the communication unit 410, the input unit 420, and the display unit 430 are similar to the descriptions of the communication unit 110, the input unit 120, and the display unit 130 in Embodiment 1.

The storage unit 440 includes a buffer 440a, a conversion table 440b, a ball management table 440c, a player management table 440d, movement definition information 440e, a trajectory candidate management table 440f, a trajectory management table 440g, and statistical information 440h. The storage unit 440 includes corresponds to a semiconductor memory device such as a RAM, a ROM or a flash memory, or a storage device such as an HDD.

The descriptions of the buffer 440a, the conversion table 440b, the ball management table 440c, the player management table 440d, and the movement definition information 440e are similar to the descriptions of the information 140a to 140e in Embodiment 1. Further, the descriptions of the trajectory candidate management table 440f, the trajectory management table 440g, and the statistical information 440h are similar to the descriptions of the information 140f to 140h in Embodiment 1.

The controller 450 includes a reception unit 450a, a ball detection unit 450b, a player detection unit 450c, a generation unit 450d, a trajectory determination unit 450e, a statistical information generation unit 450f, and an output unit 450g. The controller 450 is implemented by, for example, a CPU or an MPU. In addition, the controller 450 may be implemented by a hard-wired logic such as an ASIC or an FPGA.

The descriptions of the reception unit 450a, the ball detection unit 450b, the player detection unit 450c, and the generation unit 450d are similar to the descriptions of the reception unit 150a, the ball detection unit 150b, the player detection unit 150c, and the generation unit 150d described in Embodiment 1. Further, the descriptions of the statistical information generation unit 450f and the output unit 450g are similar to the descriptions of the statistical information generation unit 150f and the output unit 150g described in Embodiment 1.

The trajectory determination unit 450e is a processing unit that evaluates the multiple trajectory candidates included in the trajectory candidate management table 440f and determines a ball trajectory. For example, the trajectory determination unit 450e sequentially executes a process of adding a trajectory candidate, a process of determining a ball trajectory from the multiple trajectory candidates, and a process of re-evaluating the multiple trajectory candidates after the determination of a ball trajectory. Here, the process of adding a trajectory candidate is similar to the process of adding a trajectory candidate by the trajectory determination unit 150*e* as described in Embodiment 1.

Further, the process of determining a ball trajectory is similar to the process of determining a trajectory candidate from the multiple trajectory candidates by the trajectory determination unit 150*e* as described in Embodiment 1. However, the trajectory determination unit 450*e* does not delete and keeps the remaining multiple trajectory candidates other than the ball trajectory, in the trajectory candidate management table 440*f*.

Figure 28:
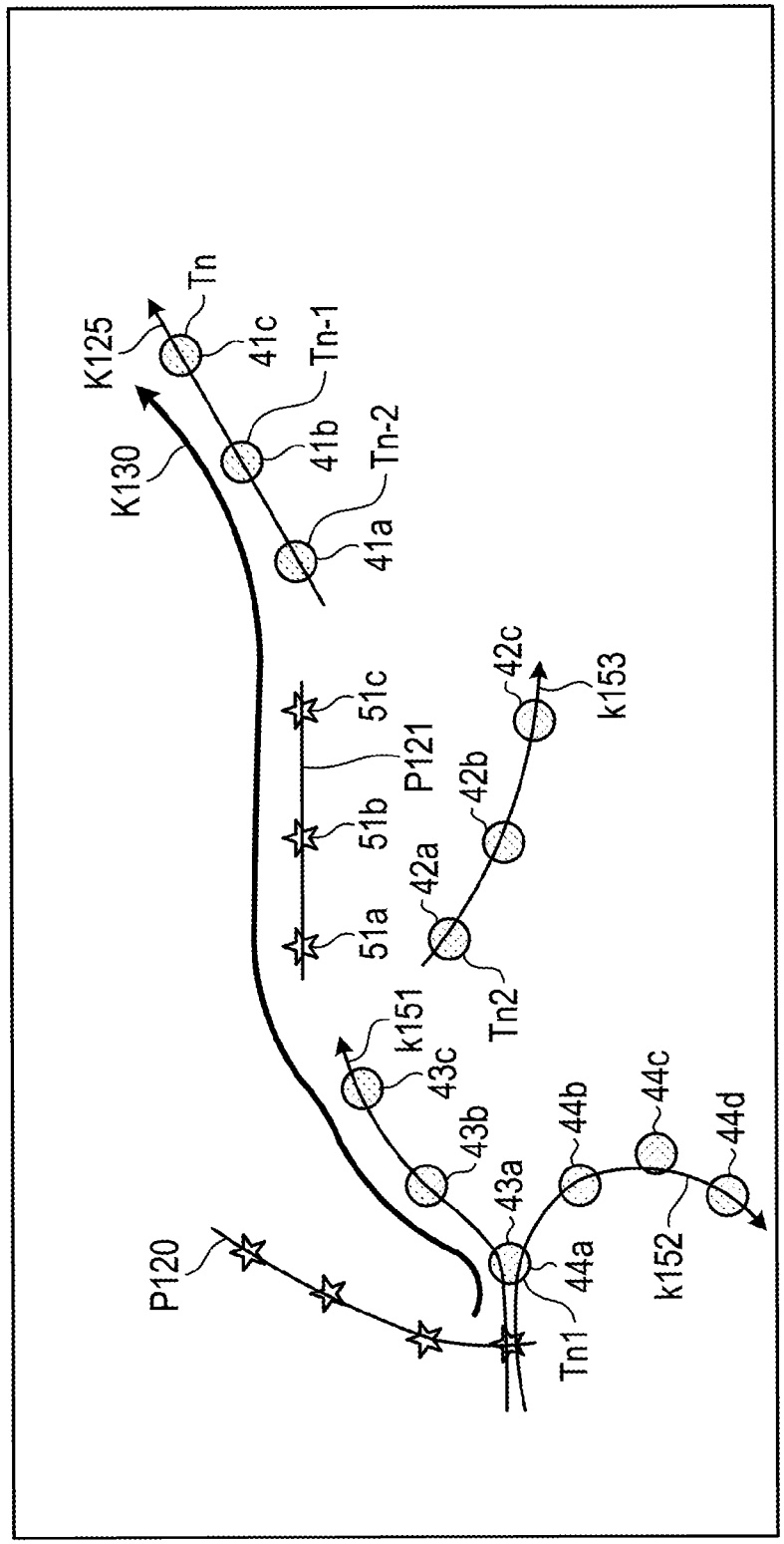
FIG. 28 is a view for describing a process performed by a trajectory determination unit according to Embodiment 4.

Descriptions will be made on the process in which the trajectory determination unit 350*e* reevaluates the multiple trajectory candidates. FIG. 28 is a view for describing the process performed by the trajectory determination unit according to Embodiment 4. In the example illustrated in FIG. 28, trajectory candidates k151, k152, and k153 exist. It is assumed that movement trajectories p120 and p121 are movement trajectories of players, respectively. A trajectory K125 is the ball trajectory determined by the "process of adding a trajectory candidate" and the "process of determining a ball trajectory from the multiple trajectory candidates."

In FIG. 28, the respective positions of the ball included in the trajectory K125 are 41*a*, 41*b*, and 41*c*. Further, the times when the ball was present at the respective positions are Tn−2, Tn−1, and Tn.

In the trajectory candidate k151, it is assumed that the ball candidate moves the positions 43*a*, 43*b*, and 43*c* in this order, and the time when the ball candidate was present at the position 43*a* is Tn1. In the trajectory candidate k152, it is assumed that the ball candidate moves past the positions 44*a* (43*a*), 44*b*, 44*c*, and 44*d* in this order, and the time when the ball candidate was present at the position 44*a* is Tn1. In the trajectory candidate k153, it is assumed that the ball candidate moves past the positions 42*a*, 42*b*, and 42*c* in this order, and the time when the ball candidate was present at the position 42*a* is Tn2.

The trajectory determination unit 450*e* selects a trajectory candidate having a ball candidate detected between times "Tn" and "Tn−m." The value of "m" is preset. For example, it is assumed that the time Tn1 is included between the times "Tn" and "Tn−m," and the time Tn2 is not included in between the times "Tn" and "Tn−m." In this case, the trajectory determination unit 450*e* selects the trajectory candidates k151 and k152.

Further, the trajectory determination unit 450*e* selects a movement trajectory detected between the times "Tn" and "Tn−m." For example, when the movement trajectory p121 includes positions 51*a*, 51*b*, and 51*c* of a player, and the times when the player was present at the respective positions 51*a*, 51*b*, and 51*c* are included between the times "Tn" and "Tn−m," the trajectory determination unit 450*e* selects the movement trajectory p121.

The trajectory determination unit 450*e* calculates an evaluation value of the selected movement trajectory p121 and trajectory candidate k151. Further, the trajectory determination unit 450*e* calculates an evaluation value of the selected movement trajectory p121 and trajectory candidate k152. For example, it is assumed that as the distance between the starting point 51*a* of the movement trajectory and the ending point of the trajectory candidate is short, the evaluation value increases. Further, it is assumed that as the angle formed by the direction of the movement trajectory and the direction of the trajectory candidate is small, the evaluation value increases. The trajectory determination unit 450*e* calculates the evaluation value by determining the formed angle as executed by the trajectory determination unit 250*e* described in Embodiment 2.

The trajectory determination unit 450*e* compares the respective evaluation values with each other, and selects a set of the movement trajectory and the trajectory candidate of which the evaluation value is relatively large. In the example illustrated in FIG. 28, since the evaluation value of the movement trajectory p121 and the trajectory candidate k151 is larger than the evaluation value of the movement trajectory p121 and the trajectory candidate k152, the set of the movement trajectory p121 and the trajectory candidate k151 is selected.

The trajectory determination unit 450*e* generates a trajectory K130 by connecting the trajectory candidate k151, the movement trajectory p121, and the trajectory K125 to each other, and registers the trajectory K130 as a ball trajectory in the trajectory management table 440*g*.

Figure 29:
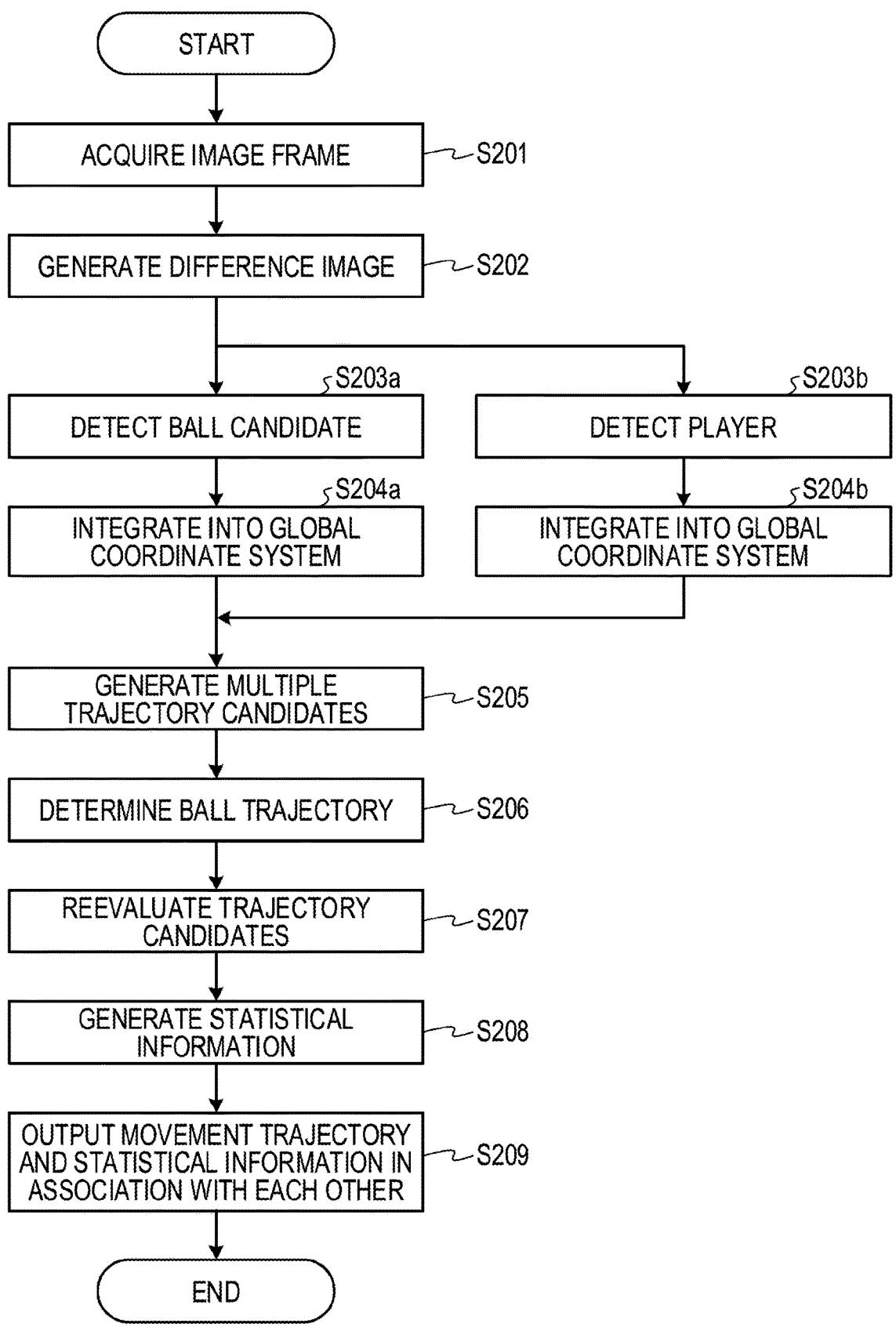
FIG. 29 is a flowchart illustrating a procedure of processes performed by the information processing apparatus according to Embodiment 4.

Next, descriptions will be made on an example of the procedure of the processes by the information processing apparatus 400 according to Embodiment 4. FIG. 29 is a flowchart illustrating the procedure of the processes by the information processing apparatus according to Embodiment 4. As illustrated in FIG. 29, the reception unit 450*a* of the information processing apparatus 400 acquires the image frame from the camera 10 and stores the image frame in the buffer 440*a* (step S201).

The ball detection unit 450*b* (and the player detection unit 450*c*) of the information processing apparatus 400 acquires two adjacent image frames from the buffer 440*a*, and generates a difference image (step S202). The ball detection unit 450*b* detects a ball candidate (step S203*a*) and integrates the coordinates of the ball region into the global coordinate system (step S204*a*), to proceed to step S205.

The player detection unit 450*c* detects a player (step S203*b*) and integrates the coordinates of the player into the global coordinate form (step S204*b*), to proceed to step S205.

The generation unit 450*d* of the information processing apparatus 400 generates multiple trajectory candidates (step S205). The trajectory determination unit 450*e* of the information processing apparatus 400 determines a ball trajectory from the multiple trajectory candidates (step S206). Further, the trajectory determination unit 450*e* reevaluates the trajectory candidates based on the determined ball trajectory (step S207). The statistical information generation unit 450*f* of the information processing apparatus 400 generates the statistical information 440*h* based on the trajectory management table 440*g* (step S208). The output unit 450*g* of the information processing apparatus 400 outputs the statistical information in association with the movement trajectory of each player to the display unit 430 (step S209).

Next, effects of the information processing apparatus 400 according to Embodiment 4 will be described. When the movement trajectory of the player is present between the starting point of the trajectory and the ending point of the trajectory candidate, the information processing apparatus 400 generates the trajectory connecting the trajectory, the movement trajectory, and the trajectory candidate to each other, and determines the generated trajectory as a ball trajectory. Thus, even in a case where the correspondence between the player and the ball may not be taken or the ball trajectory is interrupted, the trajectory that could not have been detected may be newly generated based on the determined trajectory, so that the continuity of the tracking may be improved.

Figure 30:
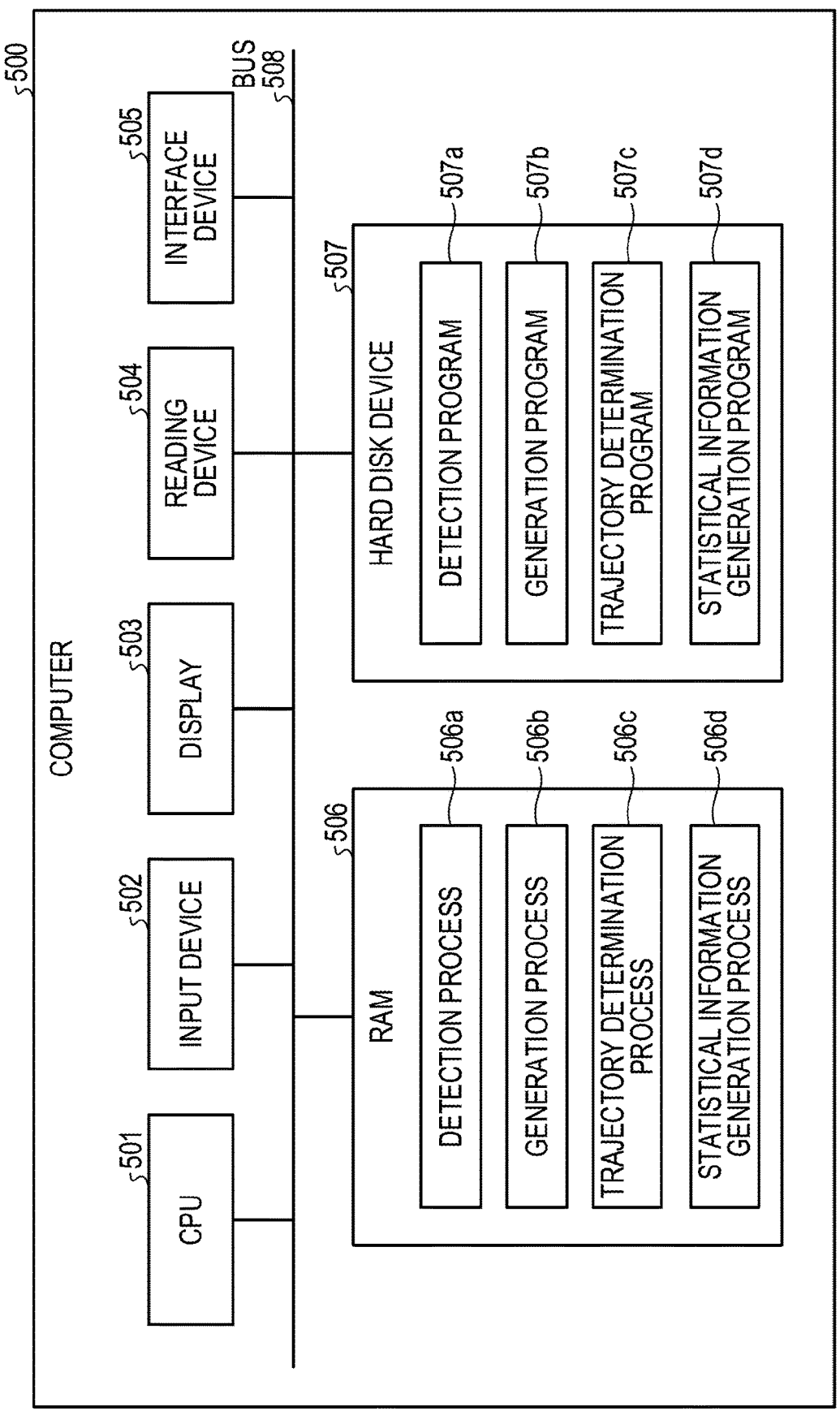
FIG. 30 is a view illustrating an example of a hardware configuration.

Next, descriptions will be made on an example of a hardware configuration of a computer that implements the functions such as the information processing apparatuses 100, 200, 300, and 400 described above in the embodiments. FIG. 30 is a view illustrating an example of the hardware configuration of the computer that implements the function such as the information processing apparatus.

As illustrated in FIG. 30, a computer 500 includes a CPU 501 that executes various arithmetic processes, an input device 502 that receives an input of data from a user, and a display 503. Further, the computer 500 includes a reading device 504 that reads out, for example, a program from a storage medium, and an interface device 505 that exchanges data with, for example, a recording device via a wired or wireless network. Further, the computer 500 includes a RAM 506 that temporarily stores various kinds of information, and a hard disk device 507. The respective devices 501 to 507 are connected to a bus 508.

The hard disk device 507 includes a detection program 507*a*, a generation program 507*b*, a trajectory determination program 507*c*, and a statistical information generation program 507*d*. The CPU 501 reads out the programs 507*a* to 507*d* and develops the programs in the RAM 506.

The detection program 507*a* functions as a detection process 506*a*. The generation program 507*b* functions as a generation process 506*b*. The trajectory determination program 507*c* functions as a trajectory determination process 506*c*. The statistical information generation program 507*d* functions as a statistical information generation process 506*d*.

The process of the detection process 506*a* corresponds to the process of the ball detection unit 150*b*, 250*b*, 350*b*, or 450*b*. The process of the generation process 506*b* corresponds to the process of the generation unit 150*d*, 250*d*, 350*d*, or 450*d*. The process of the trajectory determination process 506*c* corresponds to the process of the trajectory determination unit 150*e*, 250*e*, 350*e*, or 450*e*. The process of the statistical information generation process 406*d* corresponds to the process of the statistical information generation unit 150*f*, 250*f*, 350*f*, or 450*f*.

In addition, the respective programs 507*a* to 507*d* may not be necessarily stored in the hard disk device 507 from the first. For example, the respective programs may be stored in a "portable physical medium" such as a flexible disk (FD), a CD-ROM, a DVD, a magneto-optical disk or an IC card which is inserted into the computer 500. Then, the computer 500 may read out and execute the programs 507*a* to 507*d*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:

detecting positions of ball candidates from a plurality of time-series image frames;

adding a position of a second ball candidate to a second image frame subsequent to a first image frame based on a position of a first ball candidate and movement definition information, the first and second image frames being included in the plurality of image frames, the first ball candidate being detected from the first image frame, the movement definition information defining a characteristic of a movement of a ball;

generating a plurality of trajectory candidates by combining a plurality of ball candidates detected from image frames of different times with each other;

evaluating the plurality of trajectory candidates to determine a ball trajectory; and interpolating, when the ball trajectory is interrupted, between a starting point and an ending point of the interruption with a trajectory of a first person who moves from the starting point to the ending point.

2. The non-transitory computer-readable recording medium according to claim 1, the process further comprising:

estimating the position of the second ball candidate based on the position of the first ball candidate and the movement definition information; and adding the estimated position of the second ball candidate to the second image frame when no ball candidate is present in a predetermined range defined based on the estimated position of the second ball candidate.

3. The non-transitory computer-readable recording medium according to claim 2, the process further comprising:

assigning lost information to a third ball candidate on the second frame image, the third ball candidate not being included in the predetermined range; and determining the ball trajectory based on the lost information included in the trajectory candidates.

4. The non-transitory computer-readable recording medium according to claim 3, the process further comprising:

counting a number of ball candidates assigned with the lost information with respect to each of the plurality of trajectory candidates; and determining the ball trajectory from trajectory candidates having the counted number less than a predetermined threshold value.

5. The non-transitory computer-readable recording medium according to claim 1, the process further comprising:

comparing the determined ball trajectory and the plurality of trajectory candidates with each other to generate a new trajectory by connecting the determined ball trajectory and one of the plurality of trajectory candidates to each other.

6. The non-transitory computer-readable recording medium according to claim 1, the process further comprising:

evaluating, to determine the ball trajectory, the plurality of trajectory candidates by further using positional information of a landmark on a field where the first person plays a game.

7. The non-transitory computer-readable recording medium according to claim 1, the process further comprising:

extending the ball trajectory when a second trajectory of a second person is present between a starting point of the ball trajectory and an ending point of one of the plurality of trajectory candidates, by connecting the ball trajectory with the second trajectory and the one of the plurality of trajectory candidates.

8. The non-transitory computer-readable recording medium according to claim 1, the process further comprising:

calculating a distance of a ball dribbled by the first person or a number of times that the first player passes the ball based on the ball trajectory and the trajectory of the first person.

9. An information processing apparatus comprising:
a memory; and
a processor coupled to the memory and the processor configured to:
detect positions of ball candidates from a plurality of time-series image frames;
add a position of a second ball candidate to a second image frame subsequent to a first image frame based on a position of a first ball candidate and movement definition information, the first and second image frames being included in the plurality of image frames, the first ball candidate being detected from the first image frame, the movement definition information defining a characteristic of a movement of a ball;
generate a plurality of trajectory candidates by combining a plurality of ball candidates detected from image frames of different times with each other;
evaluate the plurality of trajectory candidates to determine a ball trajectory; and
interpolate, when the ball trajectory is interrupted, between a starting point and an ending point of the interruption with a trajectory of a first person who moves from the starting point to the ending point.

10. The information processing apparatus according to claim 9, wherein the processor is further configured to:
estimate the position of the second ball candidate based on the position of the first ball candidate and the movement definition information; and
add the estimated position of the second ball candidate to the second image frame when no ball candidate is present in a predetermined range defined based on the estimated position of the second ball candidate.

11. The information processing apparatus according to claim 10, wherein the processor is further configured to:
assign lost information to a third ball candidate on the second frame image, the third ball candidate not being included in the predetermined range; and
determine the ball trajectory based on the lost information included in the trajectory candidates.

12. The information processing apparatus according to claim 11, wherein the processor is further configured to:
count a number of ball candidates assigned with the lost information with respect to each of the plurality of trajectory candidates; and
determine the ball trajectory from trajectory candidates having the counted number less than a predetermined threshold value.

13. The information processing apparatus according to claim 9, wherein the processor is further configured to:
compare the determined ball trajectory and the plurality of trajectory candidates with each other to generate a new trajectory by connecting the determined ball trajectory and one of the plurality of trajectory candidates to each other.

14. The information processing apparatus according to claim 9, wherein the processor is further configured to:
evaluate, to determine the ball trajectory, the plurality of trajectory candidates by further using positional information of a landmark on a field where the first person plays a game.

15. The information processing apparatus according to claim 9, wherein the processor is further configured to:
extend the ball trajectory when a second trajectory of a second person is present between a starting point of the ball trajectory and an ending point of one of the plurality of trajectory candidates, by connecting the ball trajectory with the second trajectory and the one of the plurality of trajectory candidates.

16. The information processing apparatus according to claim 9, wherein the processor is further configured to:
calculate a distance of a ball dribbled by the first person or a number of times that the first player passes the ball based on the ball trajectory and the trajectory of the first person.

17. An image processing method comprising:
detecting, by a computer, positions of ball candidates from a plurality of time-series image frames;
adding a position of a second ball candidate to a second image frame subsequent to a first image frame based on a position of a first ball candidate and movement definition information, the first and second image frames being included in the plurality of image frames, the first ball candidate being detected from the first image frame, the movement definition information defining a characteristic of a movement of a ball;
generating a plurality of trajectory candidates by combining a plurality of ball candidates detected from image frames of different times with each other;
evaluating the plurality of trajectory candidates to determine a ball trajectory; and
interpolating, when the ball trajectory is interrupted, between a starting point and an ending point of the interruption with a trajectory of a first person who moves from the starting point to the ending point.

18. The image processing method according to claim 17, further comprising:
estimating the position of the second ball candidate based on the position of the first ball candidate and the movement definition information; and
adding the estimated position of the second ball candidate to the second image frame when no ball candidate is present in a predetermined range defined based on the estimated position of the second ball candidate.

19. The image processing method according to claim 18, further comprising:
assigning lost information to a third ball candidate on the second frame image, the third ball candidate not being included in the predetermined range; and
determining the ball trajectory based on the lost information included in the trajectory candidates.

20. The image processing method according to claim 19, further comprising:
counting a number of ball candidates assigned with the lost information with respect to each of the plurality of trajectory candidates; and
determining the ball trajectory from trajectory candidates having the counted number less than a predetermined threshold value.

* * * * *